(12) United States Patent
Arikawa et al.

(10) Patent No.: US 6,519,209 B1
(45) Date of Patent: Feb. 11, 2003

(54) DISPLAY DEVICE AND ELECTRONIC WATCH

(75) Inventors: Yasuo Arikawa, Chino (JP); Tsuyoshi Matsui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/462,665

(22) PCT Filed: May 12, 1999

(86) PCT No.: PCT/JP99/02462
§ 371 (c)(1),
(2), (4) Date: Mar. 3, 2000

(87) PCT Pub. No.: WO99/59023
PCT Pub. Date: Nov. 18, 1999

(30) Foreign Application Priority Data

May 12, 1998 (JP) .......................................... 10-129331
May 12, 1998 (JP) .......................................... 10-129332

(51) Int. Cl.$^7$ ...................... G04C 19/00; G02F 1/1335; G02B 5/30; G02B 27/28
(52) U.S. Cl. .......................... 368/242; 368/84; 349/96; 349/97; 349/113; 359/487; 359/497; 359/500
(58) Field of Search ...................... 368/82–84, 239–242; 349/96–100, 62, 97, 113–115; 359/487, 497, 500

(56) References Cited

U.S. PATENT DOCUMENTS 6,147,934 A * 11/2000 Arikawa et al. .............. 349/96
6,147,937 A * 11/2000 Arikawa et al. ............ 349/113

(List continued on next page.)

FOREIGN PATENT DOCUMENTS

| JP | U-62-115695 | 7/1987 |
| JP | A-10-115828 | 5/1998 |
| JP | A-11-109336 | 4/1999 |

(List continued on next page.)

Primary Examiner—Vit Miska
Assistant Examiner—Jeanne-Marguerite Goodwin
(74) Attorney, Agent, or Firm—Oliff & Berridge, PLC

(57) ABSTRACT

In a display device, a light ray transmitted through an area which varies a polarization axis, and a light ray transmitted through an area which does not vary the polarization axis, respectively, become a linearly polarized light component (a first returning light ray) which is a specularly reflected from a specular reflecting element, and transmitted through a second polarization separator, a polarization changing element, and a first polarization separator, and a linearly polarized light component (a second returning light ray) which is specularly reflected by the second polarization separator, and transmitted through the polarization changing element and the first polarization separator. The first and second returning light rays present a background portion and a segment portion in a bright display. Both the first returning light ray and the second returning light ray are specularly reflected, presenting both the background portion and the segment portion in a mirror-like fashion. Specifically, the display device may present a display mode with both the background portion and the segment portion in a mirror-like image, a display mode with both the background portion and the segment portion in a matte image, or a display mode with one of the background portion and the segment portion in a mirror-like image and the other in a matte image. With a coloring element added, display modes are thus diversified by combining a diversity of tones combined with texture differences. Of the returning light which is reflected from the specular reflecting element, transmitted through the second polarization separator, the polarization changing element, and the first polarization separator, a linearly polarized light component, which is unable to be transmitted through the first polarization separator with the direction of its polarization axis deflected from a first direction, is reflected from a fourth polarization separator. Then, the linearly polarized light component repeats reflections between the reflecting element, the fourth polarization separator, and when the polarization axis of the linearly polarized light component becomes aligned with the first direction, the linearly polarized light component is transmitted through the first polarization element.

45 Claims, 27 Drawing Sheets

U.S. PATENT DOCUMENTS

| | | |
|---|---|---|
| 6,233,029 B1 | 5/2001 | Iijima et al. |
| 6,285,422 B1 | 9/2001 | Maeda et al. |
| 6,437,840 B1 * | 8/2002 | Arikawa et al. ............. 368/84 |

FOREIGN PATENT DOCUMENTS

| | | |
|---|---|---|
| WO | WO 97/01788 | 1/1997 |
| WO | WO 98/12594 | 3/1998 |

* cited by examiner

DISPLAY DEVICE AND ELECTRONIC WATCH

BACKGROUND OF THE INVENTION

1. Field of the Invention

The present invention relates to a display device for displaying characters, numbers, patterns, etc. The present invention also relates to electronic watches, such as a wristwatch, a stopwatch, etc., incorporating the display device. Particularly, the present invention relates to a display device, such as a liquid-crystal display element, which displays information by selecting between a state which varies the polarization axis of a linearly polarized light component transmitted therethrough and a state which does not vary the polarization axis.

2. Description of Related Art

Electronic watches are the most common display devices which make use of outdoor external light to present a display. In one of the known electronic watches, a first polarizer, a polarization axis varying optical element (polarization axis varying means), such as a liquid-crystal display element, which selects between a state for varying the polarization axis of a linearly polarized light component transmitted therethrough and a state for not varying the polarization axis of the linearly polarized light component, a second polarizer, and a reflector, are laminated in that order. The liquid-crystal display element employs TN (Twisted Nematic) liquid crystal, STN (Super-Twisted Nematic) liquid crystal, or ECB (Electrically Controlled Birefringence) liquid crystal, for example.

In the electronic watch (the display device) thus constructed, each of the first and second polarizers transmits a linearly polarized light component, of an incident light ray, in alignment with its polarization axis, while absorbing a linearly polarized light component aligned in its absorption axis perpendicular to the polarization axis. Therefore, when an external light ray enters the first polarizer, only a linearly polarized light component having the polarization axis in a first direction is incident on the polarization axis varying optical element. Out of a linearly polarized light component transmitted through an area of the polarization axis varying optical element which varies the polarization axis and a linearly polarized light component transmitted through an area of the polarization axis varying optical system which does not vary the polarization axis, one of the linearly polarized light components is absorbed by the second polarizer while the other of the linearly polarized light components is transmitted through the second polarizer and reaches the reflector. Only a light ray reflected from the reflector, namely, a light ray which is transmitted through one of the area of the polarization axis varying optical element which varies the polarization axis and the area of the polarization axis varying optical element which does not vary the polarization axis, is transmitted through the polarization axis varying optical element and the first polarizer, and based on this light ray, time is visibly recognized.

In the conventional electronic watch, out of the linearly polarized light component transmitted through the area of the polarization axis varying optical element which varies the polarization axis and the linearly polarized light component transmitted through the area of the polarization axis varying optical element which does not vary the polarization axis, only one of the linearly polarized light components is reflected from the reflector, and is then transmitted through the polarization axis varying optical element and the polarizer, and then contributes to the displaying. On the other hand, the light ray transmitted through the other area is absorbed through the second polarizer, and contributes nothing to the displaying.

The conventional electronic watch thus suffers a problem that a segment portion or a background portion becomes a dark display. The legibility and brightness of the display are greatly affected by the light quantity of linearly polarized light component transmitted through the polarizers. For the same reason in the conventional electronic watch, it is difficult to present both the segment portion and the background portion in a mirror-like image, a matte image or a color display.

Also in the conventional electronic watch, a linearly polarized light component, which is supposed to be transmitted through the polarizers, is absorbed by the polarizer and contributes nothing to the displaying, because the orientation of the polarization axis is deflected from the polarization axis of the polarizer.

SUMMARY OF THE INVENTION

The present invention has been developed in view of the above problems, and two principal objects are set as follows. A first object of the present invention is to provide a display device and an electronic watch employing the display device, which presents a high legibility and gives a reflective display made up of combinations of a diversity of textures and tones, by making use of external light and by outputting toward the user a linearly polarized light component, regardless of whether it is transmitted through the area for varying the polarization axis or the area for not varying the polarization axis.

A second object of the present invention is to provide a display device and an electronic watch employing the display device, which increases the quantity of light contributing to displaying and presents a bright display by transmitting a linearly polarized light component, even with its polarization axis deflected, through the polarizing splitter means, of linearly polarized light components, transmitted through polarizing splitter means and in order to contribute to displaying.

The present invention has been developed in view of the above background, and to achieve the first object, the following display device is provided. The display device includes first polarizing splitter means (first polarization separator) which transmits a linearly polarized light component, of an incident light ray, aligned in a first direction, while not transmitting a linearly polarized light component aligned perpendicular thereto, polarization axis varying means (polarization changing element) which selects one of a first state which varies the polarization axis of an incident linearly polarized light component when the incident linearly polarized light component is transmitted therethrough and a second state which does not vary the polarization axis when the incident linearly polarized light component is transmitted therethrough, second polarizing splitter means (second polarization separator) which transmits a linearly polarized light component, of an incident light ray, aligned in a second direction, while specularly reflecting a linearly polarized light component aligned in a third direction perpendicular to the second direction, and specular reflective means (reflecting element) which specularly reflects a linearly polarized light component, transmitted through the second polarizing splitter means, toward the second polarizing splitter means, wherein the first polarizing splitter means, the polarization axis varying means, the second polarizing splitter means, and specular reflective means are arranged in that order, and wherein the display device displays predetermined information using a first returning light ray which is specularly reflected from the specular reflective means, and transmitted through the second polarizing splitter means, the polarization axis varying means, and the first polarizing splitter means, and a second light ray which is specularly reflected from the second polarizing splitter means, and transmitted through the polarization axis varying means and the first polarizing splitter means, out of light rays which come in on the first polarizing splitter means from the side of the first polarizing splitter means diametrically opposite to the polarization axis varying means.

The specular reflective means may be a total reflection optical element for reflecting the total of or most of the linearly polarized light component incident thereon.

The total reflection optical element may be a total reflection mirror for reflecting the total of or most of the linearly polarized light component incident thereon.

The total reflection optical element may be third polarizing splitter means (third polarization separator) for reflecting the total of or most of the linearly polarized light component aligned in the second direction while not reflecting the linearly polarized light component aligned perpendicular thereto.

The specular reflective means may be a partially reflective optical element for specularly reflecting part of an incident linearly polarized light component while transmitting the remaining incident linearly polarized light component.

The partially reflective optical element may be a half mirror, in which a metal thin film is formed on the surface of a light transmissive substrate.

The partially reflective optical element may be third polarizing splitter means which transmits a linearly polarized light component aligned in a fourth direction while specularly reflecting a linearly polarized light component aligned in a fifth direction perpendicular to the fourth direction, and, because of a deflection between the fourth direction and the second direction, the third polarizing splitter means specularly reflects part of a linearly polarized light component incident thereon, while transmitting part of the incident linearly polarized light component.

The display device may include a light source for backlighting, disposed diametrically opposite to the second polarizing splitter means with respect to the intervening specular reflective means, for emitting light toward the specular reflective means, wherein the display device displays predetermined information using a linearly polarized light component which is emitted from the backlighting light source, and transmitted through the specular reflective means, the second polarizing splitter means, the polarization axis varying means, and the first polarizing splitter means.

The display device may include fourth polarizing splitter means (fourth polarization separator) which is arranged between the first polarizing splitter means and the polarization axis varying means, and transmits a linearly polarized light component aligned in a sixth direction while reflecting a linearly polarized light component aligned in a seventh direction perpendicular to the sixth direction, wherein the sixth direction is in the same direction as the first direction or is slightly deflected from the first direction.

The display device may include first light diffusing means (diffusing element), disposed between the specular reflective means and the second polarizing splitter means, for transmitting an incident light ray while diffusing the incident light ray.

The display device may include second light diffusing means, disposed between the second polarizing splitter means and the polarization axis varying means, for transmitting an incident light ray while diffusing the incident light ray in a pattern different from a pattern imparted by the first light diffusing means.

The light diffusing means may diffuse the light ray through fine surface roughness.

The display device may further include first coloration means (first coloring element), disposed between the specular reflective means and the second polarizing splitter means, for coloring an incident light ray to output a colored light ray.

The display device may further include second coloration means (second coloring element), disposed between the first polarizing splitter means and the second polarizing splitter means, for coloring an incident light ray to output a colored light ray.

The display device may further include first coloration means, disposed between the specular reflective means and the second polarizing splitter means, for coloring an incident light ray to output a colored light ray, and second coloration means, disposed between the first polarizing splitter means and the second polarizing splitter means, for coloring an incident light ray to output a colored light ray with a hue different from a hue imparted by the first coloration means.

The coloration means may be a color filter.

The coloration means may be a coloration layer attached on at least one of the plurality of polarizing splitter means.

The polarization axis varying means may include a liquid-crystal display element.

The display device may be incorporated in an electronic watch. The electronic watch may include the display device, wherein the electronic watch displays time and time measurement results in areas of the polarization axis varying means which are selected to be in a transmissive state that transmits the linearly polarized light component, transmitted through the first polarizing splitter means, therethrough with the polarization axis of the linearly polarized light component varied or in a transmissive state that transmits the linearly polarized light component therethrough with the polarization axis not varied.

The electronic watch may display time and time measurement results in a digital display in areas of the polarization axis varying means which are selected to be in a transmissive state that transmits the linearly polarized light component, transmitted through the first polarizing splitter means, therethrough with the polarization axis of the linearly polarized light component varied or in a transmissive state that transmits the linearly polarized light component therethrough with the polarization axis not varied.

The electronic watch may display time and time measurement results, in an analog display pattern corresponding to a watch hand, in areas of the polarization axis varying means which are selected to be in a transmissive state that transmits the linearly polarized light component, transmitted through the first polarizing splitter means, therethrough with the polarization axis of the linearly polarized light component varied or in a transmissive state that transmits the linearly polarized light component therethrough with the polarization axis not varied.

To achieve the second object, the present invention provides the following display devices.

A display device of the present invention may include first polarizing splitter means which transmits a linearly polarized light component, of an incident light ray, aligned in a first direction, while not transmitting a linearly polarized light component aligned perpendicular thereto, polarization axis varying means which selects one of a first state which varies the polarization axis of an incident linearly polarized light component when the incident linearly polarized light component is transmitted therethrough and a second state which does not vary the polarization axis when the incident linearly polarized light component is transmitted therethrough, second polarizing splitter means which transmits a linearly polarized light component, of an incident light ray, aligned in a second direction, reflective means which reflects the linearly polarized light component, transmitted through the second polarizing splitter means, toward the second polarizing splitter means, wherein the first polarizing splitter means, the polarization axis varying means, the second polarizing splitter means, and the reflective means are arranged in that order, and wherein the display device displays predetermined information using a returning light ray which is reflected from the reflective means, and transmitted through the second polarizing splitter means, the polarization axis varying means, and the first polarizing splitter means, out of light rays which come in on the first polarizing splitter means from the side of the first polarizing splitter means diametrically opposite to the polarization axis varying means. The display device further includes fourth polarizing splitter means which is disposed between the first polarizing splitter means and the polarization axis varying means, and transmits a linearly polarized light component, of an incident light ray, aligned in the same direction as the first direction, or aligned in a direction slightly deflected from the first direction, while reflecting a linearly polarized light component aligned in a direction perpendicular thereto.

The direction of the polarization axis of the linearly polarized light component transmitted through the third polarizing splitter means may make an angle of 20° or smaller with the first direction.

The direction of the polarization axis of the linearly polarized light component transmitted through the third polarizing splitter means may make an angle of 5° or smaller with the first direction.

The second polarizing splitter means may reflect a linearly polarized light component aligned in a third direction perpendicular to the second direction.

The reflective means may be a total reflection optical element for reflecting the total of or most of the linearly polarized light component incident thereon.

The total reflection optical element may be a total reflection mirror for reflecting the total of or most of the linearly polarized light component incident thereon.

In one aspect of the present invention, the total reflection optical element may be third polarizing splitter means which reflects the total of or most of the linearly polarized light component aligned in the second direction while not reflecting the linearly polarized light component aligned perpendicular thereto.

The reflective means may be a partially reflective optical element for reflecting part of a linearly polarized light component incident thereon while transmitting the remaining incident linearly polarized light component.

The partially reflective optical element may be a half mirror, in which a metal thin film is formed on the surface of a light transmissive substrate.

The partially reflective optical element may be third polarizing splitter means which transmits a linearly polarized light component aligned in a fourth direction while reflecting a linearly polarized light component aligned in a fifth direction perpendicular to the fourth direction, and, because of a deflection between the fourth direction and the second direction, the third polarizing splitter means reflects part of a linearly polarized light component incident thereon, while transmitting part of the incident linearly polarized light component.

The display device may include a light source for backlighting, disposed diametrically opposite to the second polarizing splitter means with respect to the intervening reflective means, for emitting light toward the reflective means, wherein the display device displays predetermined information using a linearly polarized light component which is emitted from the backlighting light source, and transmitted through the reflective means, the second polarizing splitter means, the polarization axis varying means, and the first polarizing splitter means.

The display device may include first light diffusing means, disposed between the reflective means and the second polarizing splitter means, for transmitting an incident light ray while diffusing the incident light ray.

The display device may include second light diffusing means, disposed between the second polarizing splitter means and the polarization axis varying means, for transmitting an incident light ray while diffusing the incident light ray in a pattern different from a pattern imparted by the first light diffusing means.

The light diffusing means may diffuse the light ray through fine surface roughness.

The display device further include first coloration means, disposed between the reflective means and the second polarizing splitter means, for coloring an incident light ray to output a colored light ray.

The display device may further include second coloration means, disposed between the first polarizing splitter means and the second polarizing splitter means, for coloring an incident light ray to output a colored light ray.

The display device may further include first coloration means, disposed between the reflective means and the second polarizing splitter means, for coloring an incident light ray to output a colored light ray, and second coloration means, disposed between the first polarizing splitter means and the second polarizing splitter means, for coloring an incident light ray to output a colored light ray with a hue different from the hue imparted by the first coloration means.

The coloration means may be a color filter.

The coloration means may be a coloration layer attached on at least one of the plurality of polarizing splitter means.

The polarization axis varying means may include a liquid-crystal display element.

The display device may be incorporated in an electronic watch. The electronic watch incorporating the display device may display time and time measurement results in areas of the polarization axis varying means which are selected to be in a transmissive state that transmits the linearly polarized light component, transmitted through the first polarizing splitter means, therethrough with the polarization axis of the linearly polarized light component varied or in a transmissive state that transmits the linearly polarized light component therethrough with the polarization axis not varied.

The electronic watch may display time and time measurement results in a digital display in areas of the polarization axis varying means which are selected to be in a transmissive state that transmits the linearly polarized light component, transmitted through the first polarizing splitter means, therethrough with the polarization axis of the linearly polarized light component varied or in a transmissive state that transmits the linearly polarized light component therethrough with the polarization axis not varied.

The electronic watch may display time and time measurement results, in an analog display pattern corresponding to a watch hand, in areas of the polarization axis varying means which are selected to be in a transmissive state that transmits the linearly polarized light component, transmitted through the first polarizing splitter means, therethrough with the polarization axis of the linearly polarized light component varied or in a transmissive state that transmits the linearly polarized light component therethrough with the polarization axis not varied.

DETAILED DESCRIPTION OF THE PREFERRED EMBODIMENTS

Figure 1:
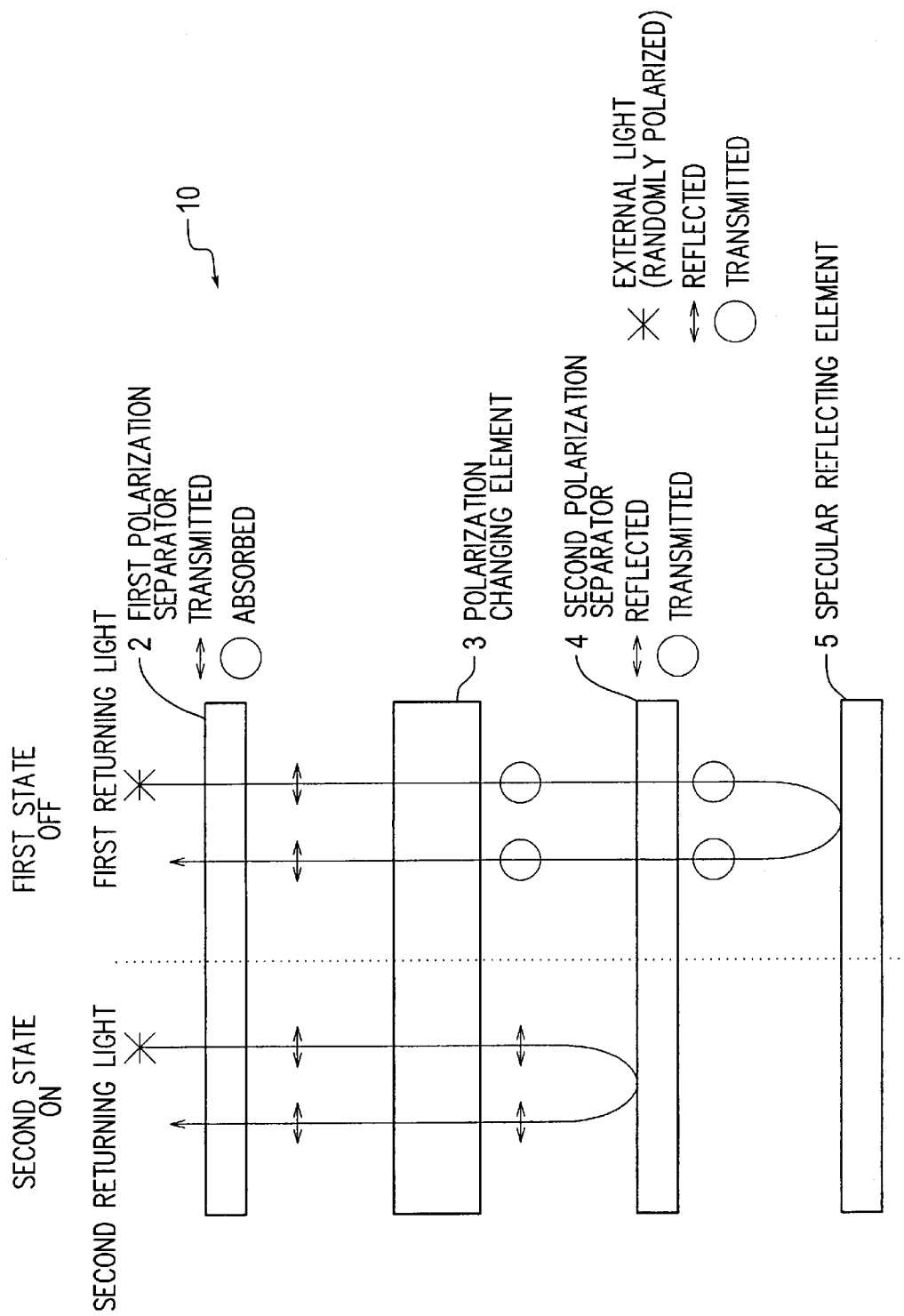
FIG. 1 is a diagrammatic view showing elements constituting a display device according to one aspect in connection with the display device of the present invention.
Figure 2:
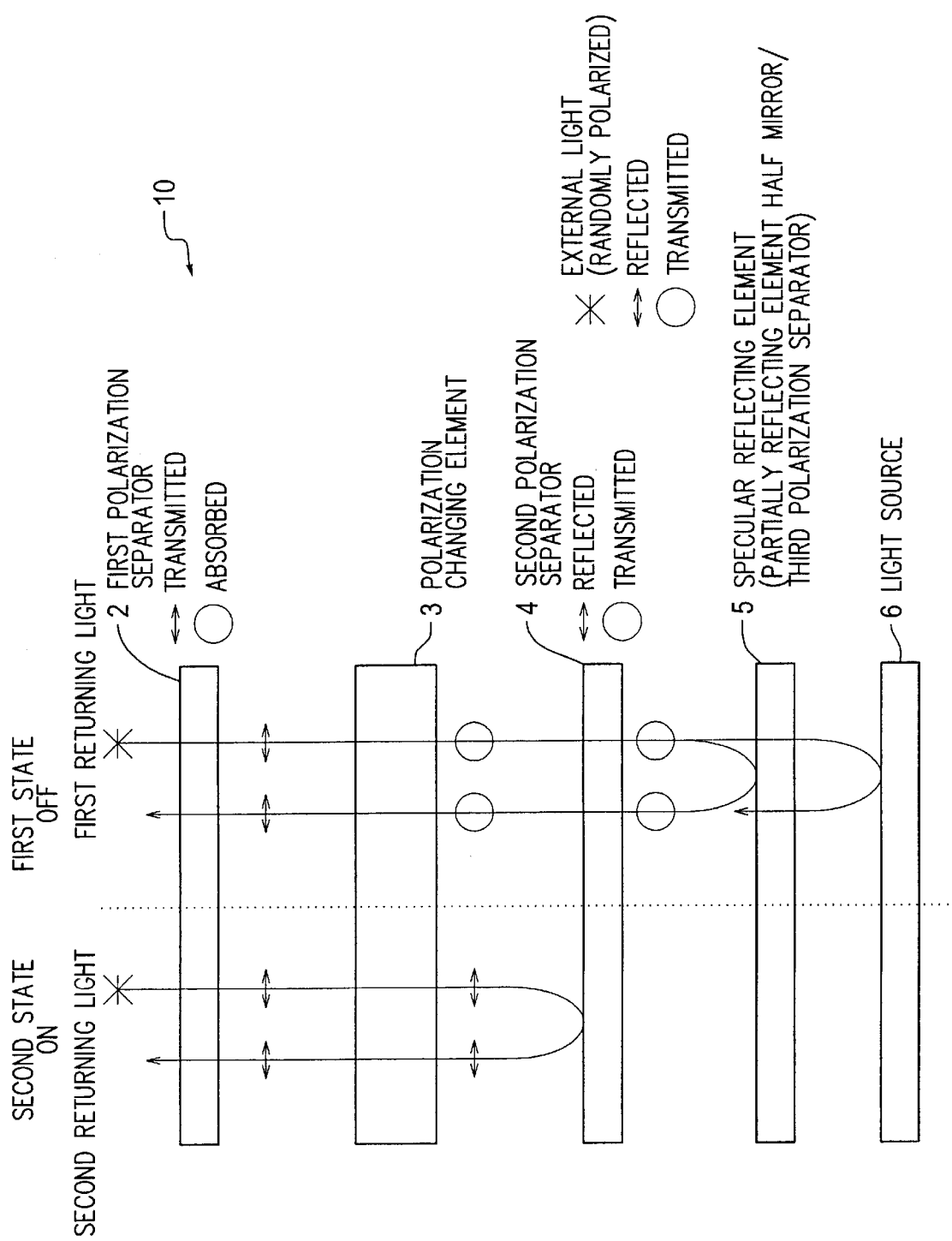
FIG. 2 is a diagrammatic view showing elements constituting a display device according to another aspect in connection with the display device of the present invention.
Figure 3:
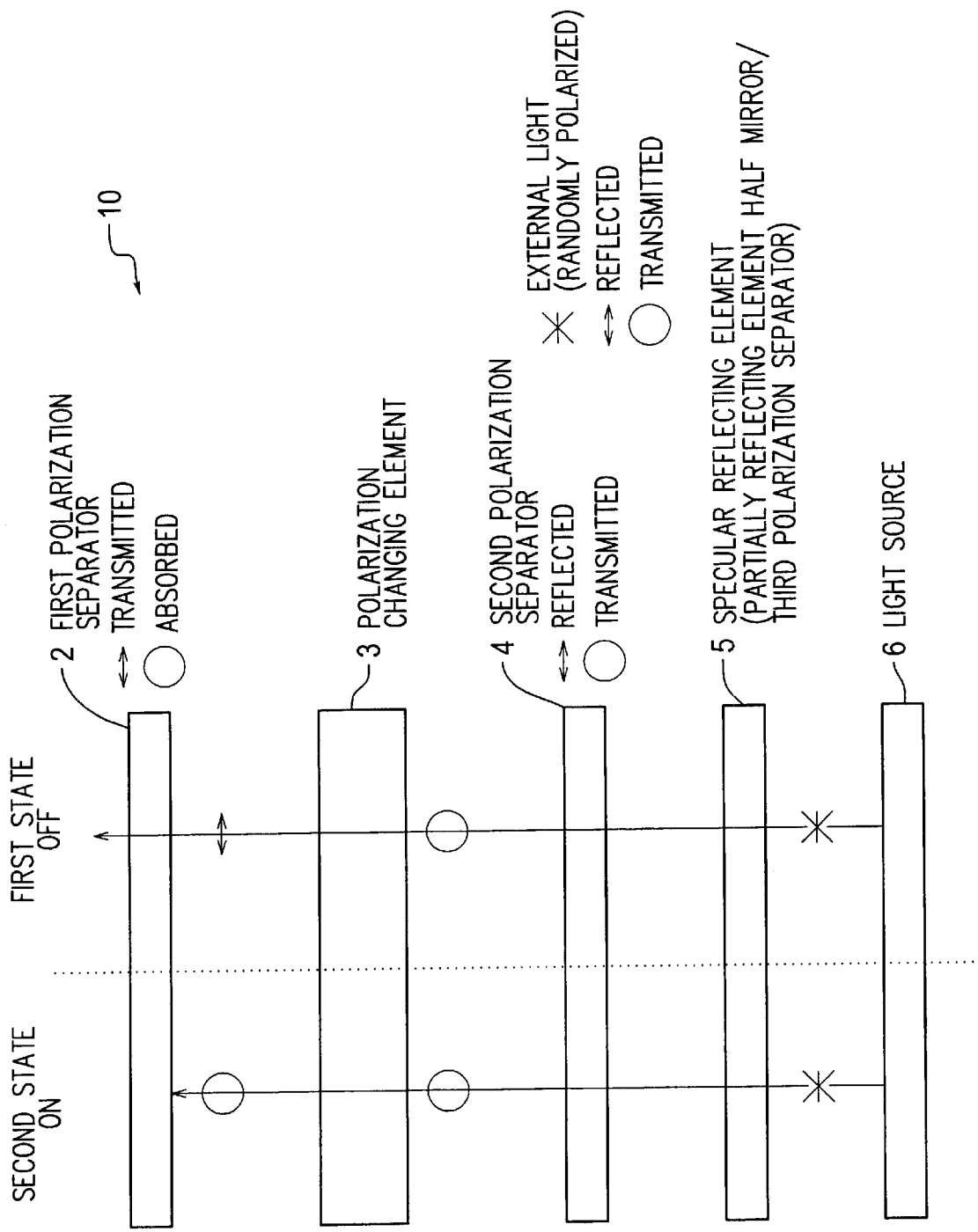
FIG. 3 is an explanatory view showing the operation of a transmissive type display using a light source for backlighting in the display device of FIG. 2.
Figure 4:
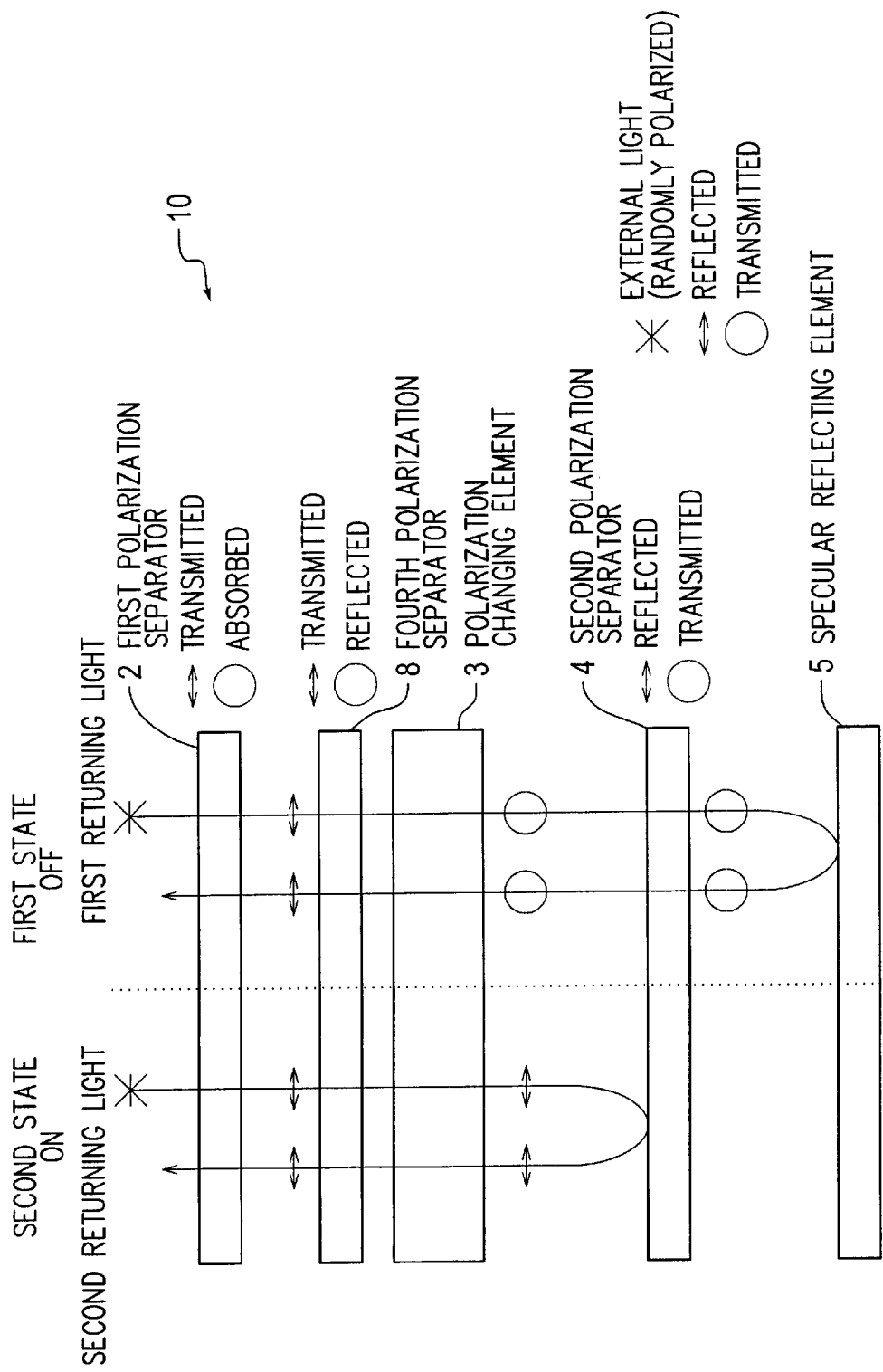
FIG. 4 is a diagrammatic view showing a display device of FIG. 1 in which the invention according to another aspect is implemented.
Figure 5:
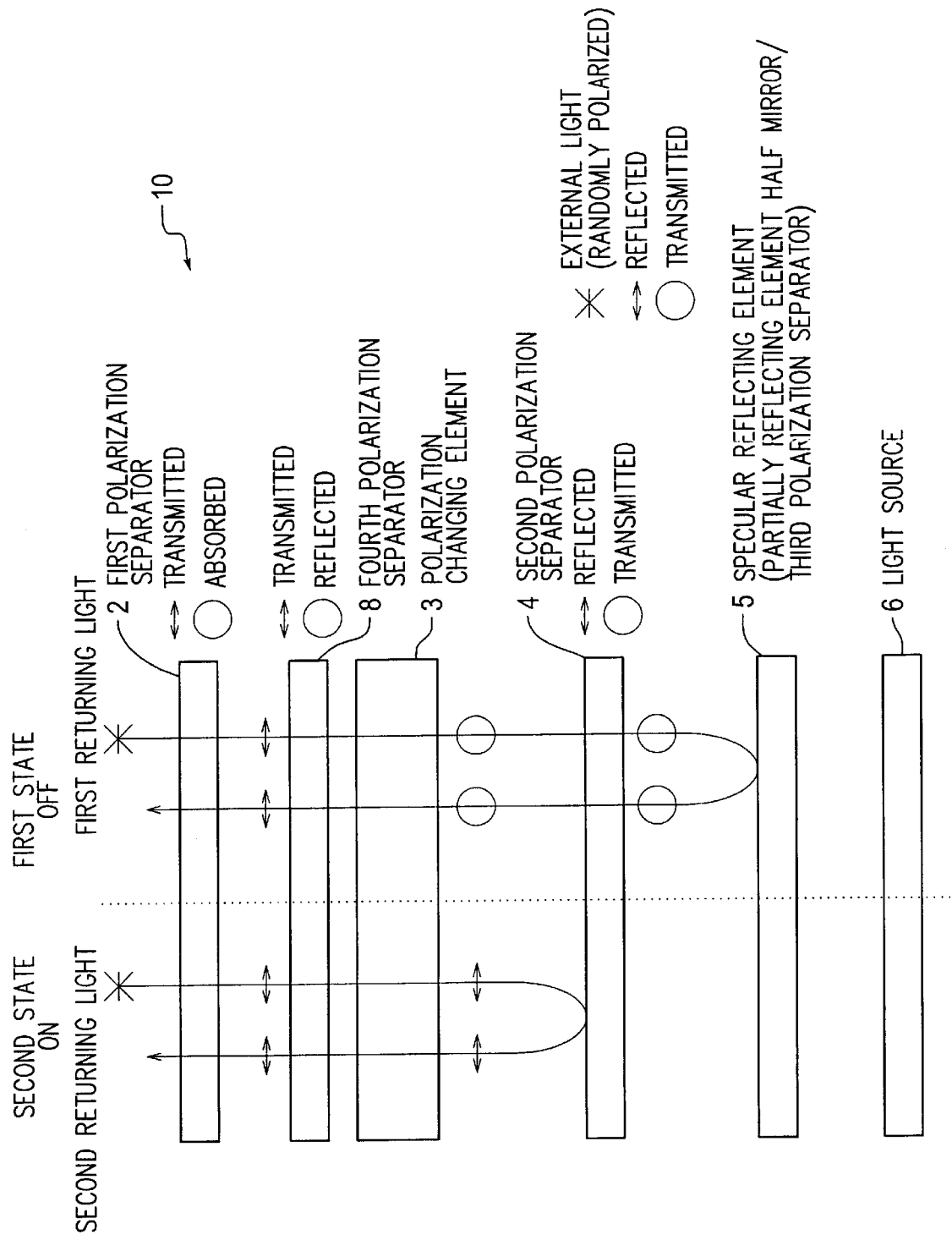
FIG. 5 is a diagrammatic view showing a display device of FIG. 2 in which the invention according to another aspect is implemented.

Referring to the drawings, the embodiments of the present invention are now discussed.

(General Construction of Electronic Watch)

Figure 6:
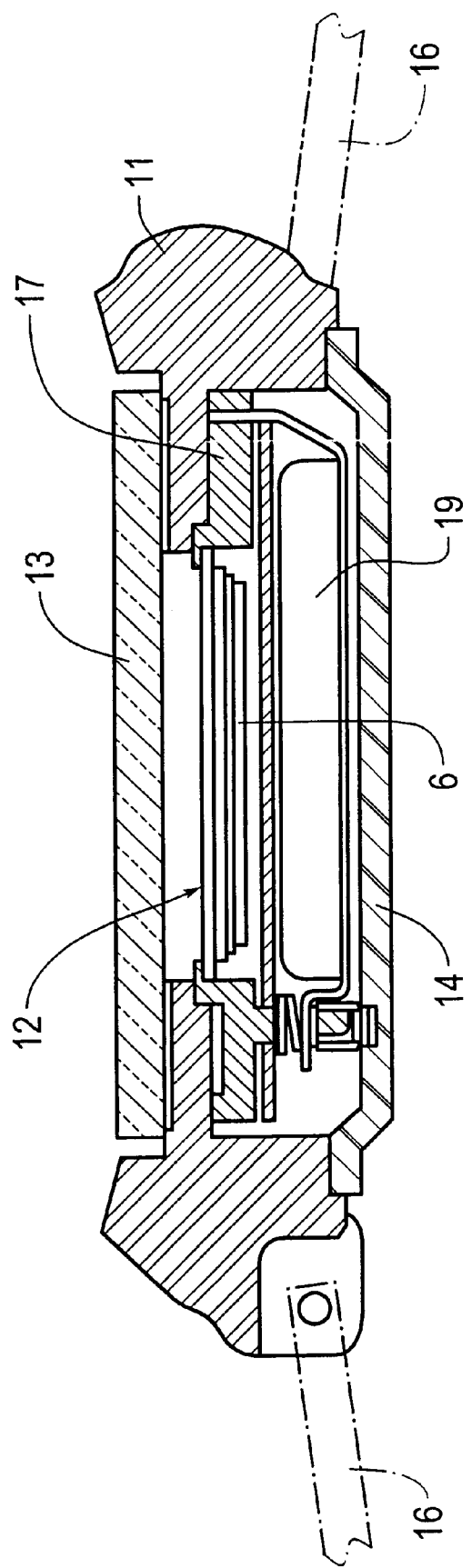
FIG. 6 is a cross-sectional view showing one example of an electronic watch in which the display device of the present invention is incorporated.
Figure 7:
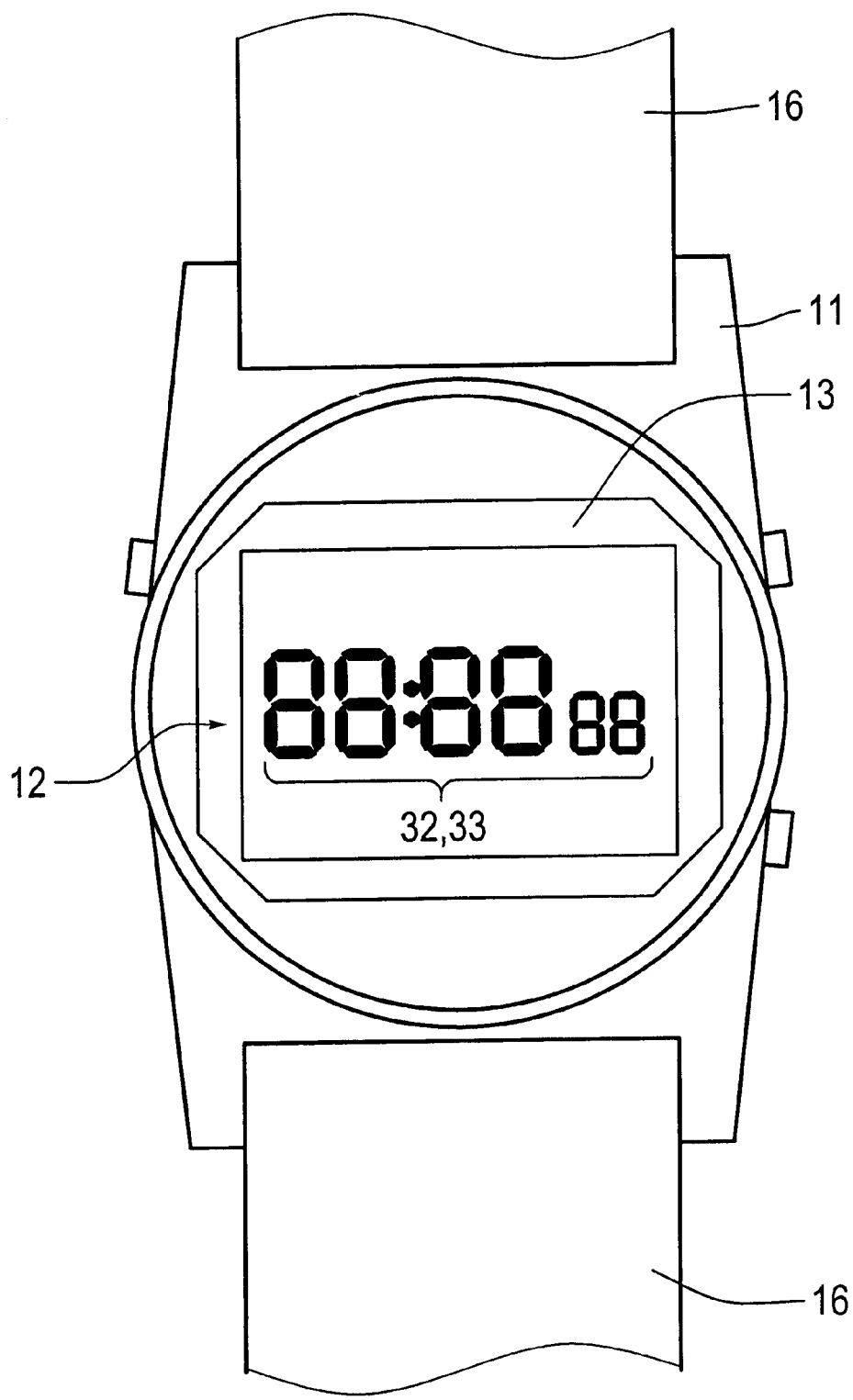
FIG. 7 is a plan view of the electronic watch of FIG. 6.
Figure 8:
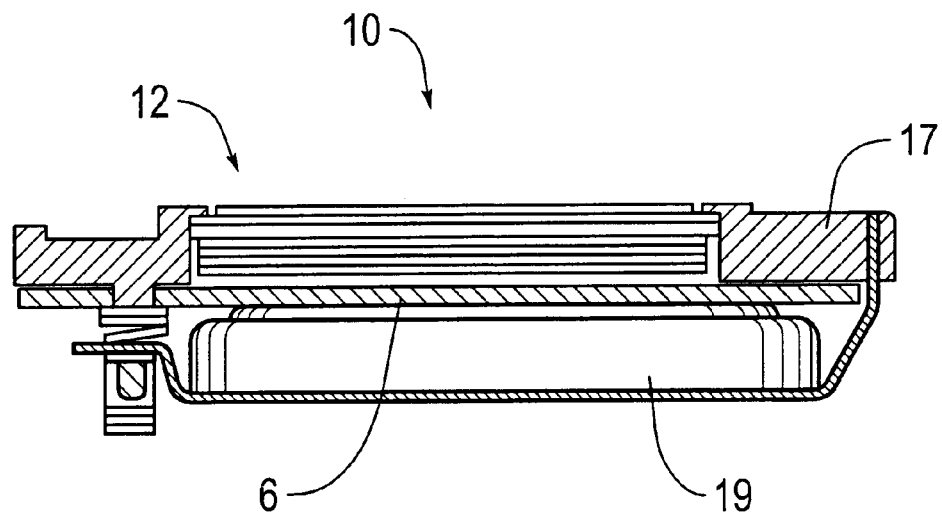
FIG. 8 is a cross-sectional view of a movement of the electronic watch of FIG. 6.

FIG. 6 through FIG. 8 are respectively a cross-sectional view and a plan view of one embodiment of an electronic watch of the present invention and a cross-sectional view of its movement 12.

Referring to FIG. 6 through FIG. 8, the electronic watch includes a plastic case 11, a movement 12 housed in the case 11, a glass plate 13 placed on the movement 12 and affixed to the case 11, and a case back 14 for supporting the movement 12. Referring to FIG. 8, a display device 10 is constructed in the movement 12, as will be discussed later in connection with each embodiment, and the display device 10 is provided with a light source 6 for backlighting, as necessary. Also, a battery 19 is included therein. The movement 12 is supported by a frame 17 of its own.

Although an example shown in FIG. 7 indicates time in a digital display on the display device 10, time may be indicated by an analog display using a display pattern corresponding to hands.

(Description of Components Used in Display Device 10)

Components used in the present invention are discussed (see FIG. 1 through FIG. 5, and FIG. 10 through FIG. 20) before discussing the embodiments.

A known polarizer may be used for first polarizing splitter means 2. When natural light is incident on the polarizer, a linearly polarized light component aligned in a predetermined direction (for example, in a direction parallel to the page, also referred to as a first direction) is transmitted, while a linearly polarized light component perpendicular thereto, namely, perpendicular to the page, is absorbed and not transmitted.

A known liquid-crystal display panel (liquid-crystal display element) may be used for polarization axis varying means 3. The liquid-crystal display panel, although not shown, includes a pair of opposing transparent glass substrates, and a liquid crystal, such as a TN liquid crystal is encapsulated in a space, namely, a so-called cell gap formed between the glass substrates. A plurality of segment electrodes (transparent electrodes) for displaying information made up of numerals and characters as shown in FIG. 7 are formed on each of the glass substrates so that these segment electrodes on the respective substrates face each other. The liquid-crystal display panel shown in FIG. 7 uses a transparent electrode, which are divided into seven segment transparent electrodes, to display a single number. A predetermined voltage is fed across a pair of segment electrodes, facing each other, and one of the two states in the alignment of the liquid crystal is set depending on whether the voltage is applied (ON) or not applied (OFF). In this embodiment, the polarization axis of a linearly polarized light ray, when transmitted through the liquid crystal, is twisted by 90° when the segment electrode is in the OFF state (the first state). On the other hand, the polarization axis of a linearly polarized light ray, when transmitted through the liquid crystal, is transmitted with the polarization axis not varied when the segment electrode is in an ON state (the second state).

A polarizing splitter film disclosed in international publications of International Publication No. WO95/17692 or No. WO95/27919 may be used for second polarizing splitter means 4 and fourth polarizing splitter means 8. The polarizing splitter film transmits a linearly polarized light ray aligned in one direction while specularly reflecting remaining linearly polarized light rays rather than absorbing them. The polarizing splitter film specularly reflects all of the linearly polarized light ray aligned perpendicular to the polarization axis.

Figure 9:
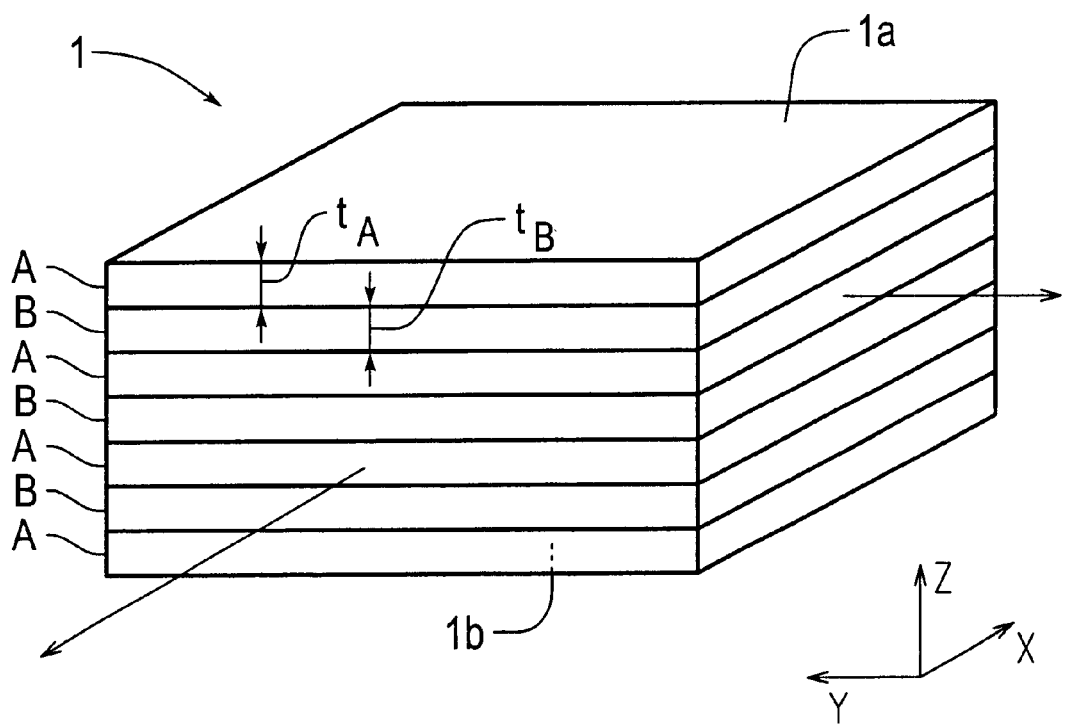
FIG. 9 is an explanatory view of a polarizing splitter film for use as polarizing splitter means in the present invention.

Referring to FIG. 9, the polarizing splitter film has a multilayered structure in which two layers A and B are alternately laminated. A refractive index $n_{AX}$ of the layer A in the X direction is different from a refractive index $n_{AY}$ of the layer A in the Y direction. A refractive index $n_{BX}$ of the layer B in the X direction is equal to a refractive index $n_{BY}$ of the layer B in the Y direction. The refractive index $n_{AY}$ of the layer A in the Y direction is equal to the refractive index $n_{BY}$ of the layer B in the Y direction.

When light rays are normally incident on the polarizing splitter film 1 on its top surface 1a, a linearly polarized light ray aligned in the Y direction, out of these light rays, is transmitted through the polarizing splitter film 1 and exits from the bottom surface 1b as a linearly polarized light ray aligned in the Y direction. Conversely, when light rays are normally incident on the bottom surface 1b of the polarizing splitter film 1, a linearly polarized light ray aligned in the Y direction, out of these light rays, is transmitted through the polarizing splitter film 1, and exists from the top surface 1a as a linearly polarized light ray aligned in the Y direction. Here, the Y direction, in which a transmitting light ray is aligned, is called a polarization axis (a transmission axis).

Now let $t_A$ represent the thickness of the layer A in the Z direction, $t_B$ represent the thickness of the layer B in the Z direction, and $\lambda$ represent the wavelength of an incident light ray. If the following equation about optical characteristics holds, $$t_A \cdot n_{AX} + t_B \cdot n_{BX} = \lambda/2 \tag{1}$$

the linearly polarized light ray aligned in the X direction, out of the incident light rays, is reflected by the polarizing splitter film 1 as a linearly polarized light ray aligned in the X direction when light rays having a wavelength of $\lambda$ are normally incident on the top surface 1a of the polarizing splitter film 1. The linearly polarized light ray having a wavelength of $\lambda$, normally incident on the bottom surface 1b of the polarizing splitter film 1, is reflected from the polarizing splitter film 1 as a linearly polarized light ray aligned in the X direction. The X direction, in which the reflecting light ray is aligned, is called a reflection axis.

If equation (1) holds within a certain visible light wavelength range by varying the thickness $t_A$ of the layer A in the Z direction and the thickness $t_B$ of the layer B in the Z direction in the polarizing splitter film 1, only a light ray within a certain wavelength range ($\Delta\lambda$) is reflected, while a light ray within the remaining wavelength range ($-\Delta\lambda$) is transmitted therethrough. Specifically, the linearly polarized light component aligned in the Y direction is transmitted as a Y direction linearly polarized light ray, while a linearly polarized light component in the X direction and within the remaining wavelength range ($-\Delta\lambda$) is transmitted as an X direction linearly polarized light ray.

Specular reflective means 5 may be anything as long as it performs specular reflection. For example, the specular reflective means 5 is a total reflection optical element which totally reflects all incident linearly polarized light component, or a partially reflective optical element which specularly reflects part of the incident light while transmitting the remaining incident light.

A total reflection mirror may be used for the total reflection optical element. Also used as the total reflection optical element is a polarizing splitter film which reflects light rays aligned in a particular direction, if the polarization axes of these linearly polarized light components are made aligned in that particular direction, while transmitting a linearly polarized light component aligned perpendicular thereto.

The partially reflective optical element may be, for example, a half mirror in which a metal thin film (aluminum foil) is formed on a light transmissive substrate. Such a half mirror is manufactured by depositing aluminum on a light transmissive film.

The partially reflective optical element may be third polarizing splitter means which transmits a linearly polarized light component aligned in a fourth direction, which makes a predetermined angle with a particular direction (a second direction, for example) in which the polarization axes of linearly polarized light components of incident light rays are made aligned, while the third polarizing splitter means specularly reflects a linearly polarized light component aligned in a fifth direction perpendicular to the fourth direction. The polarizing splitter film 1, which has been discussed with reference to FIG. 9, may also be used for the third polarizing splitter means. Because of a predetermined angular deflection between the fourth direction, namely, the transmission direction, and the second direction, which is the direction of the polarization axis of the linearly polarized light component incident on the third polarizing splitter means, the third polarizing splitter means is used as the partially reflective optical element which specularly reflects part of the incident linearly polarized light component while transmitting part of the incident linearly polarized light component. Specifically, by slightly deflecting the directions of the polarization axes of the two polarizing splitter films, the partially reflective optical element results.

A transparent substrate having a matte surface or concentric grooves (a texture) thereon may be used for first and second light diffusing means 92. Since the first and second light diffusing means 92 may be anything as long as it diffuses light, a substrate with watermarks may also serve the purpose. Rather than using an independent single optical element, another optical element with its surface machined for light diffusion may be used for the first and second light diffusing means 92. In any case, the degree of light diffusion preferably falls within a haze factor range of 10% to 60%. The haze factor is defined by the following equation.

Haze factor=(transmittance ratio of diffused light)/(transmittance ratio of total light)×100

A color filter is the most common and inexpensive candidate as first and second coloration means 71 and 72. The use of the color filter facilitates production management, because the color filter is fitted according to specifications at the final assembly stage. In the present invention, a coloration layer attached onto a resin layer constituting the polarizing splitter film 1 as the polarizing splitter means may be used for the first and second coloration means 71 and 72. Specifically, since the polarizing splitter film is constructed of polyester resin, the polyester resin is dyed with a dye for resin which is a low-viscosity dispersion dye, based on a special glycolether blended with an anionic surface-active agent. In a dyeing process, water of 20 cc is added to a stock solution of dye for resin to produce a dyeing solution, and the dyeing solution is kept at a temperature within a range of 70±10° C. The polarizing splitter film with a protective cover peeled from one side is immersed into the dyeing solution and is left there for 5 to 8 minutes with the solution stirred. After this dyeing process, the polarizing splitter film is cleaned in water and is then dried. The use of such coloration means thus constructed provides an advantage that there is no need to pay attention to the rotation of the polarization axis due to the color filter, in contrast to the case when the color filter is employed. Since this arrangement is also free from diffusion and reflection resulting from the surface of the color filter, a bright display is advantageously provided. A component count reduction permits a reduction in the number of manufacturing steps. Furthermore, the elimination of the color filter reduces the thickness of the display device. Depending on the dyeing manner, a diversity of textures is introduced into a display, making the display fashionable.

A light source 6 for backlighting may be an EL (Electroluminescence) device, a cold-cathode type LED (Light Emitting Diode), or the like.

The display devices employing these optical components are now discussed. In the drawings showing the embodiments, the components are shown apart, but in practice, the components are attached together.

(First Embodiment)

Figure 10:
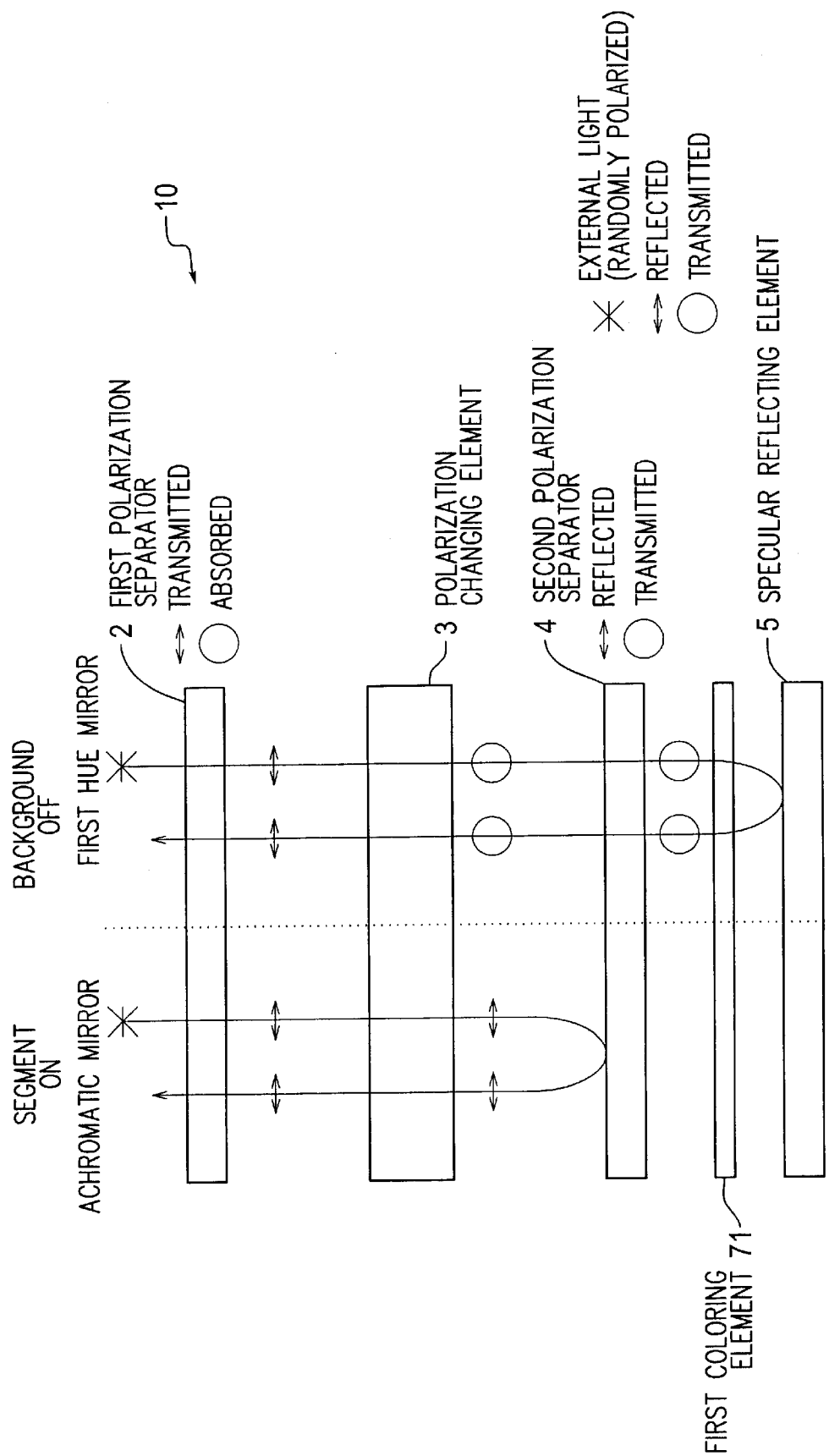
FIG. 10 is a diagrammatic view showing the construction of the display device of a first embodiment of the present invention.

FIG. 10 is a diagrammatic view showing the display device of a first embodiment of the present invention.

Referring to FIG. 10, the display device 10 of this embodiment includes first polarizing splitter means 2 which transmits a linearly polarized light component, of an incident light ray, aligned in a first direction, polarization axis varying means 3 which selects one of a first state which varies the polarization axis of an incident linearly polarized light component when the incident linearly polarized light component is transmitted therethrough and a second state which does not vary the polarization axis when the incident linearly polarized light component is transmitted therethrough, second polarizing splitter means 4 which transmits a linearly polarized light component, of an incident light ray, aligned in a second direction, while reflecting a linearly polarized light component aligned in a third direction perpendicular to the second direction, and specular reflective means 5, which is disposed at a position diametrically opposite to the polarization axis varying means 3 with respect to the intervening second polarizing splitter means 4, and which specularly reflects a linearly polarized light component, transmitted through the second polarizing splitter means 4, toward the second polarizing splitter means 4, wherein the first polarizing splitter means 2, the polarization axis varying means 3, the second polarizing splitter means 4, and the specular reflective means 5 are arranged in that order. The specular reflective means 5 is a total reflection optical element for reflecting the total of or most of an incident light ray.

First coloration means 71 for coloring an incident light ray to output a colored light ray is arranged between the specular reflective means 5 and the second polarizing splitter means 4.

The display device displays predetermined information using a first returning light ray which is reflected from the specular reflective means 5, and transmitted through the second polarizing splitter means 4, the polarization axis varying means 3, and the first polarizing splitter means 2, and a second light ray which is reflected from the second polarizing splitter means 4, and transmitted through the polarization axis varying means 3 and the first polarizing splitter means 2, out of light rays which come in on the first polarizing splitter means 2 from the side of the first polarizing splitter means 2 diametrically opposite to the polarization axis varying means 3.

The display operation of such a display device is now discussed in detail. The electronic watch performs a transmissive type display taking advantage of the reflection of external light when the external light is available. When the electronic watch presents background on its display screen, the liquid-crystal display element (the polarization axis varying means 3) in that area is set to an OFF state. When the electronic watch presents numeric information on a segment display on the display screen, the liquid-crystal display element in the corresponding area is set to an ON state.

When the external light is incident on the electronic watch under this condition, a linearly polarized light component, of the external light, aligned parallel to the page is transmitted through the first polarizing splitter means 2 while a linearly polarized light component aligned perpendicular to the page is absorbed by the first polarizing splitter means 2.

In a no voltage applied (OFF) area in the polarization axis varying means 3, a linearly polarized light ray aligned parallel to the page is twisted in polarization direction by 90° by the TN liquid crystal, becoming a linearly polarized light component aligned perpendicular to the page. This linearly polarized light ray reaches the second polarizing splitter means 4.

The linearly polarized light ray aligned perpendicular to the page is transmitted through the second polarizing splitter means 4, and the first coloration means 71, and reaches the specular reflective means 5.

The linearly polarized light ray aligned perpendicular to the page is reflected from the specular reflective means 5, transmitted through the second polarizing splitter means 4, and incident on the polarization axis varying means 3. The linearly polarized light ray incident on the polarization axis varying means 3 is twisted again in polarization direction by 90° by the TN liquid crystal, becoming a linearly polarized light ray aligned parallel to the page. Therefore, a first returning light reflected from the specular reflective means 5 is output from the first polarizing splitter means 2 as a linearly polarized light ray parallel to the page. For this reason, the background portion is presented in a chromatic color mirror-like image defined by the first coloration means 71.

In contrast, in a voltage applied (ON) area, a linearly polarized light ray, out of the external light, which is aligned parallel to the page and transmitted through the first polarizing splitter means 2, is transmitted through the polarization axis varying means 3 without being varied in polarization direction by the TN liquid crystal, and reaches the second polarizing splitter means 4. This linearly polarized light ray parallel to the page is reflected from the second polarizing splitter means 4. Since the second polarizing splitter means 4 is constructed of the polarizing splitter film 1 discussed with reference to FIG. 9, the second polarizing splitter means 4 specularly reflects the light ray coming from the polarization axis varying means 3.

The linearly polarized light ray (a second returning light) aligned parallel to the page and reflected from the second polarizing splitter means 4 is incident on the polarization axis varying means 3. The linearly polarized light component incident on the polarization axis varying means 3 exits without being varied in polarization direction, as a linearly polarized light ray aligned parallel to the page. The second returning light reflected from the second polarizing splitter means 4 exits from the first polarizing splitter means 2 as a linearly polarized light ray aligned parallel to the page. For this reason, the segment portion is presented in an achromatic color mirror-like image.

As discussed above, in accordance with the present embodiment, a light ray transmitted through an area of polarization axis varying means 3 which varies polarization axis, and a light ray transmitted through an area of the polarization axis varying means 3 which does not vary the polarization axis, respectively become the linearly polarized light component (the first returning light ray) which is reflected from the specular reflective means 5, and transmitted through the second polarizing splitter means 4, the polarization axis varying means 3, and the first polarizing splitter means 2, and the linearly polarized light component (the second returning light ray) which is reflected by the second polarizing splitter means 4, and transmitted through the polarization axis varying means 3 and the first polarizing splitter means 2. The first and second returning light rays reach the eye of the user, and the electronic watch thus presents the background portion and the segment portion in a bright display. The legibility of the display is advantageously high. Since the linearly polarized light component, transmitted through the second polarizing splitter means 4, the polarization axis varying means 3, and the first polarizing splitter means 2, is the one reflected from the specular reflective means 5, the background portion or the segment portion is presented in a mirror-like image in the electronic watch.

(Second Embodiment)

Figure 11:
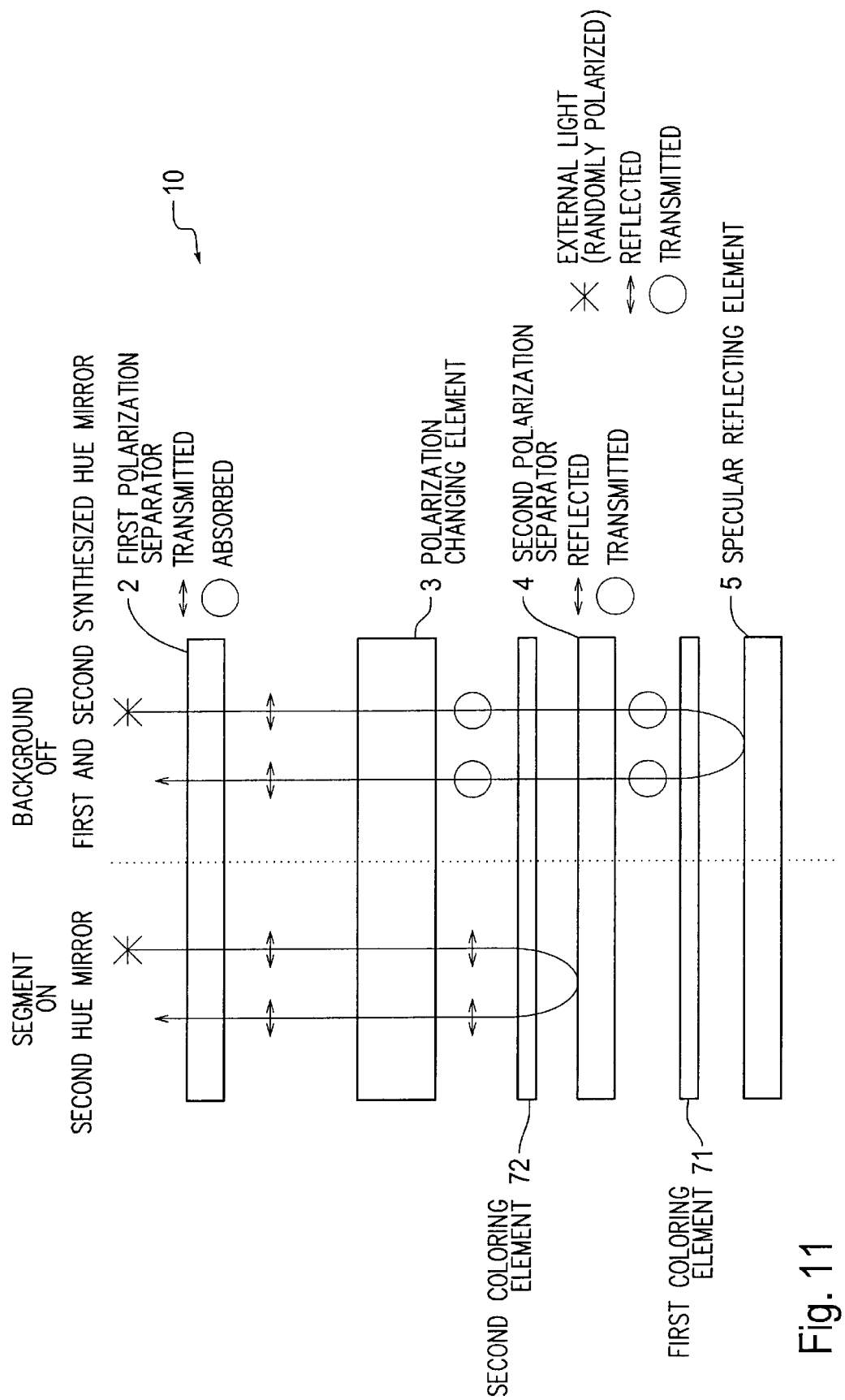
FIG. 11 is a diagrammatic view showing the construction of the display device of a second embodiment of the present invention.

FIG. 11 is a diagrammatic view showing the display device of a second embodiment of the present invention.

In accordance with the first embodiment, the segment portion, corresponding to the voltage applied (ON) area in the polarization axis varying means 3, is presented in an achromatic color mirror-like image. If the second coloration means 72 is interposed between the polarization axis varying means 3 and the second polarizing splitter means 4 as shown in FIG. 11, the segment portion is presented in a mirror-like image in a hue determined by the second coloration means 72. The background portion, corresponding to the no voltage applied (OFF) area in the polarization axis varying means 3, is presented in a mirror-like image in a hue synthesized from the colors imparted by the first coloration means 71 and the second coloration means 72.

(Third Embodiment)

Figure 12:
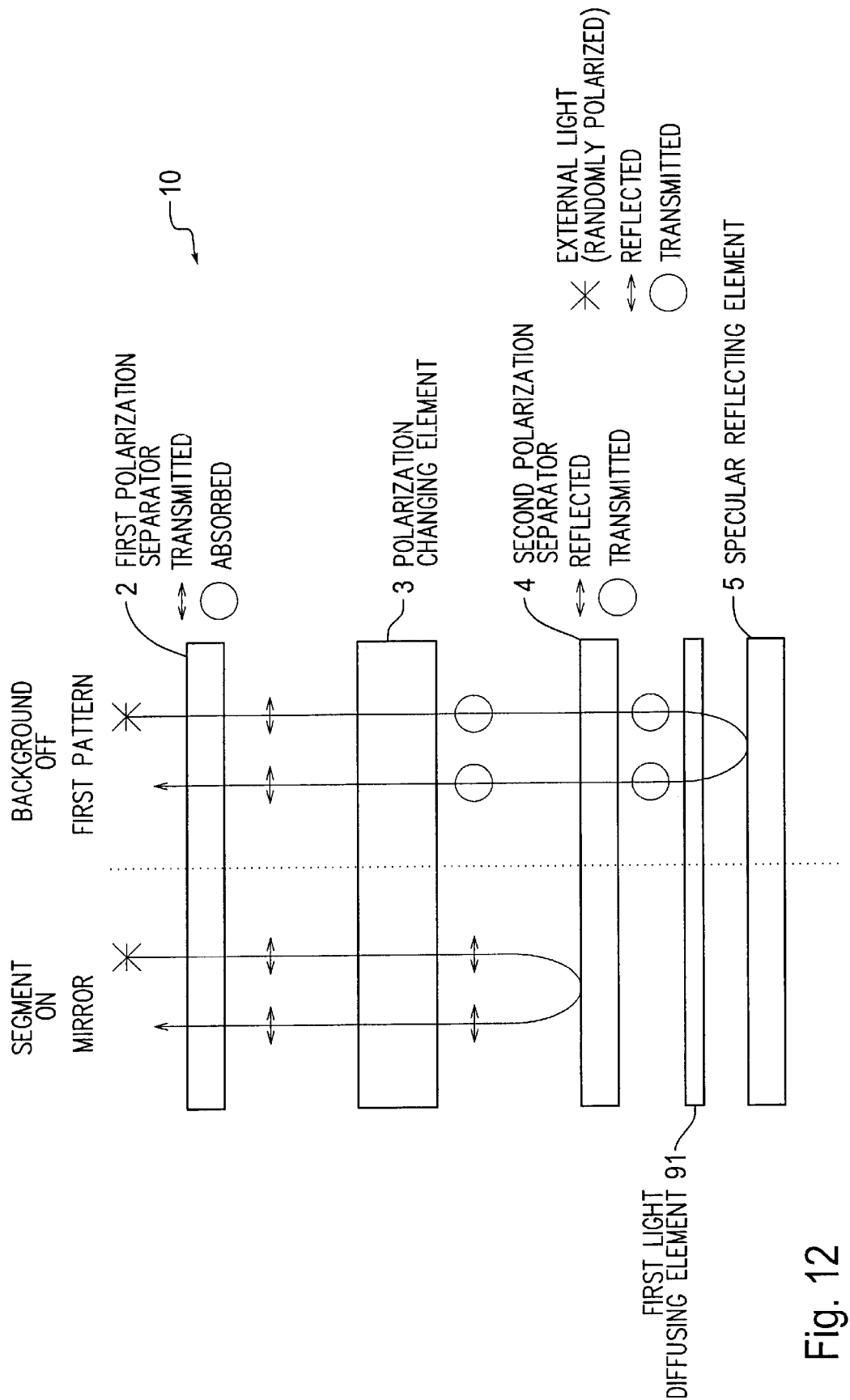
FIG. 12 is a diagrammatic view showing the construction of the display device of a third embodiment of the present invention.

FIG. 12 is a diagrammatic view showing the display device of a third embodiment of the present invention.

Referring to FIG. 12, light diffusing means 91 is interposed between the second polarizing splitter means 4 and the specular reflective means 5 but no coloration means is arranged in this embodiment. With this arrangement, the segment portion is presented in an achromatic color mirror-like fashion, but the background is presented in a fine pattern through a texture imparted by the light diffusing means 91, rather than being presented in a mirror-like image.

(Fourth Embodiment)

Figure 13:
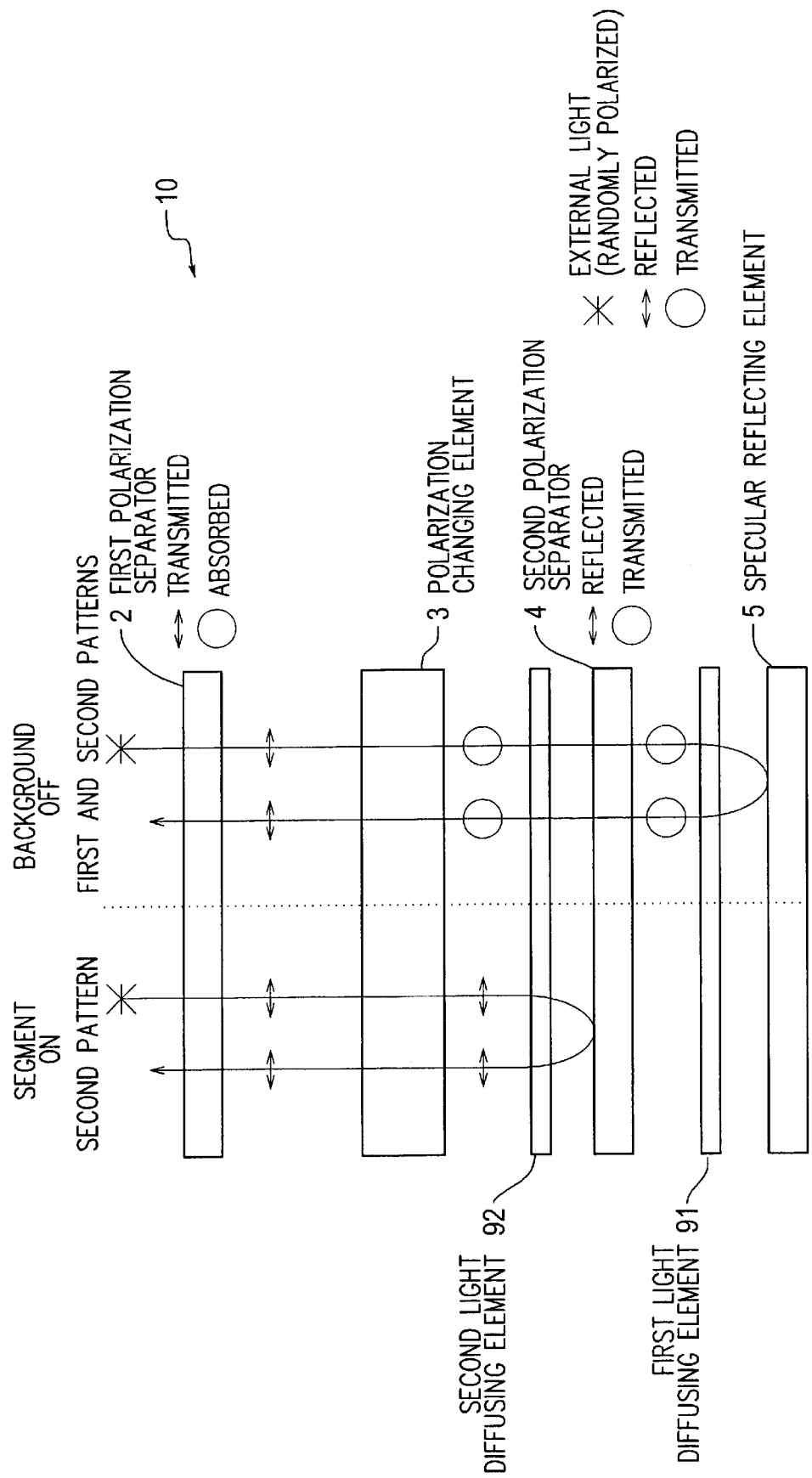
FIG. 13 is a diagrammatic view showing the construction of the display device of a fourth embodiment of the present invention.

FIG. 13 is a diagrammatic view showing the display device of a fourth embodiment of the present invention.

In the third embodiment, the segment portion, corresponding to the voltage applied (ON) area in the polarization axis varying means 3, is presented in an achromatic color mirror-like image. If second light diffusing means 92 is interposed between the polarization axis varying means 3 and the second polarizing splitter means 4 as shown in FIG. 13, the segment portion is also presented in a fine pattern through a texture imparted by the second light diffusing means 92. The background portion, corresponding to the no voltage applied (OFF) area in the polarization axis varying means 3, is presented in a pattern synthesized from the patterns imparted by the first light diffusing means 91 and the second light diffusing means 92.

(Fifth Embodiment)

Figure 14:
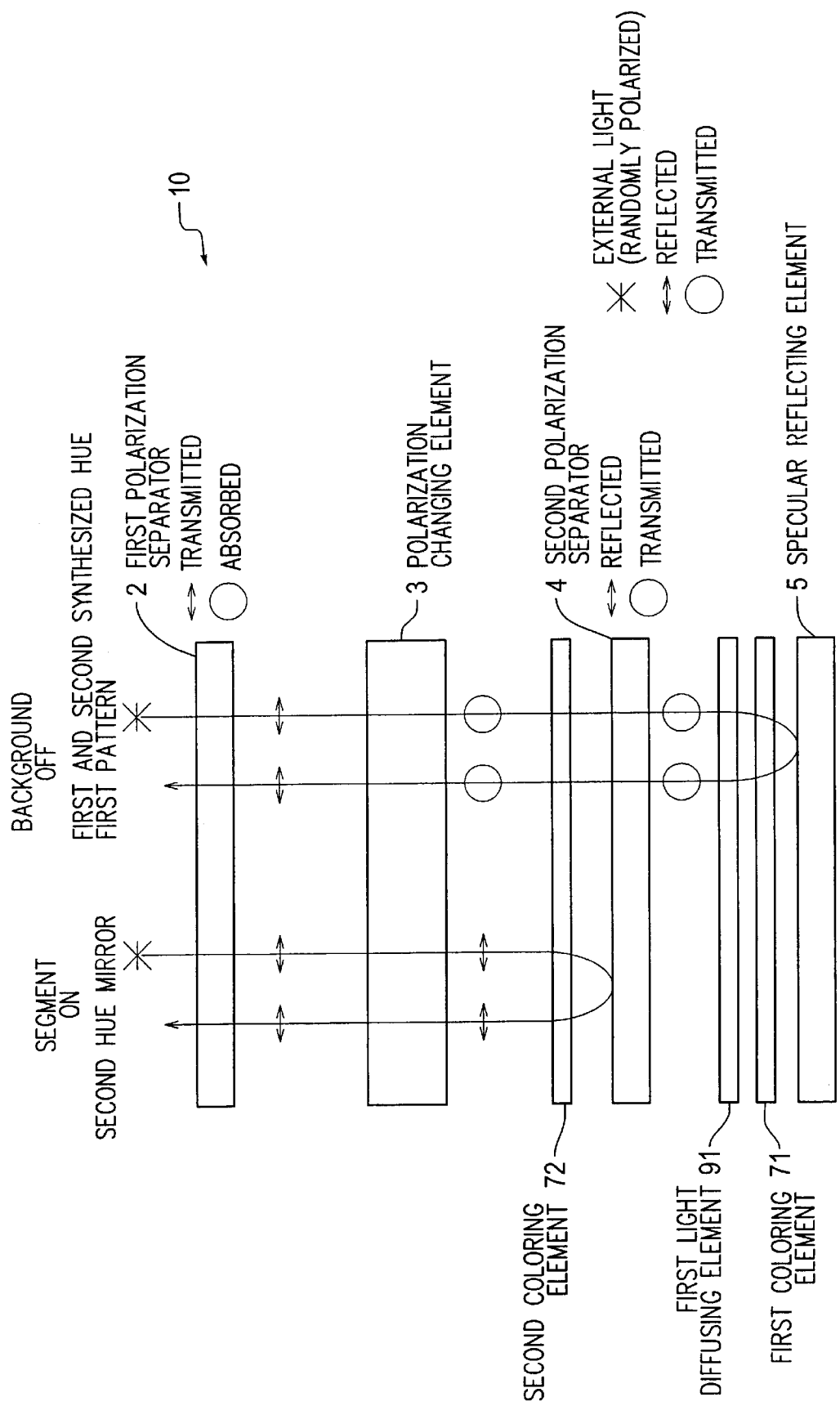
FIG. 14 is a diagrammatic view showing the construction of the display device of a fifth embodiment of the present invention.

FIG. 14 is a diagrammatic view showing the display device of a fifth embodiment of the present invention.

In the first through fourth embodiments, the segment portion, corresponding to the voltage applied (ON) area, and the background portion, corresponding to the no voltage applied (OFF) area, are differentiated by employing either the coloration means or the light diffusing means. The coloration means and the light diffusing means may be used in combination as described below.

Specifically, in this embodiment, the first coloration means 71 is interposed between the second polarizing splitter means 4 and the specular reflective means 5, and the second coloration means 72 is interposed between the polarization axis varying means 3 and the second polarizing splitter means 4, as shown in FIG. 14. Furthermore, the first light diffusing means 91 is arranged between the second polarizing splitter means 4 and the specular reflective means 5. In this case, the order of the lamination of the first coloration means 71 and the first light diffusing means 91 may be reversed.

The display device 10 thus constructed presents the segment portion in a mirror-like image with a hue defined by the second coloration means 72. In contrast, the background portion, corresponding to the no voltage applied (OFF) are in the polarization axis varying means 3, is presented in a hue synthesized from the colors of the first coloration means 71 and the second coloration means 72 and in a pattern imparted by the first light diffusing means 91.

(Sixth Embodiment)

Figure 15:
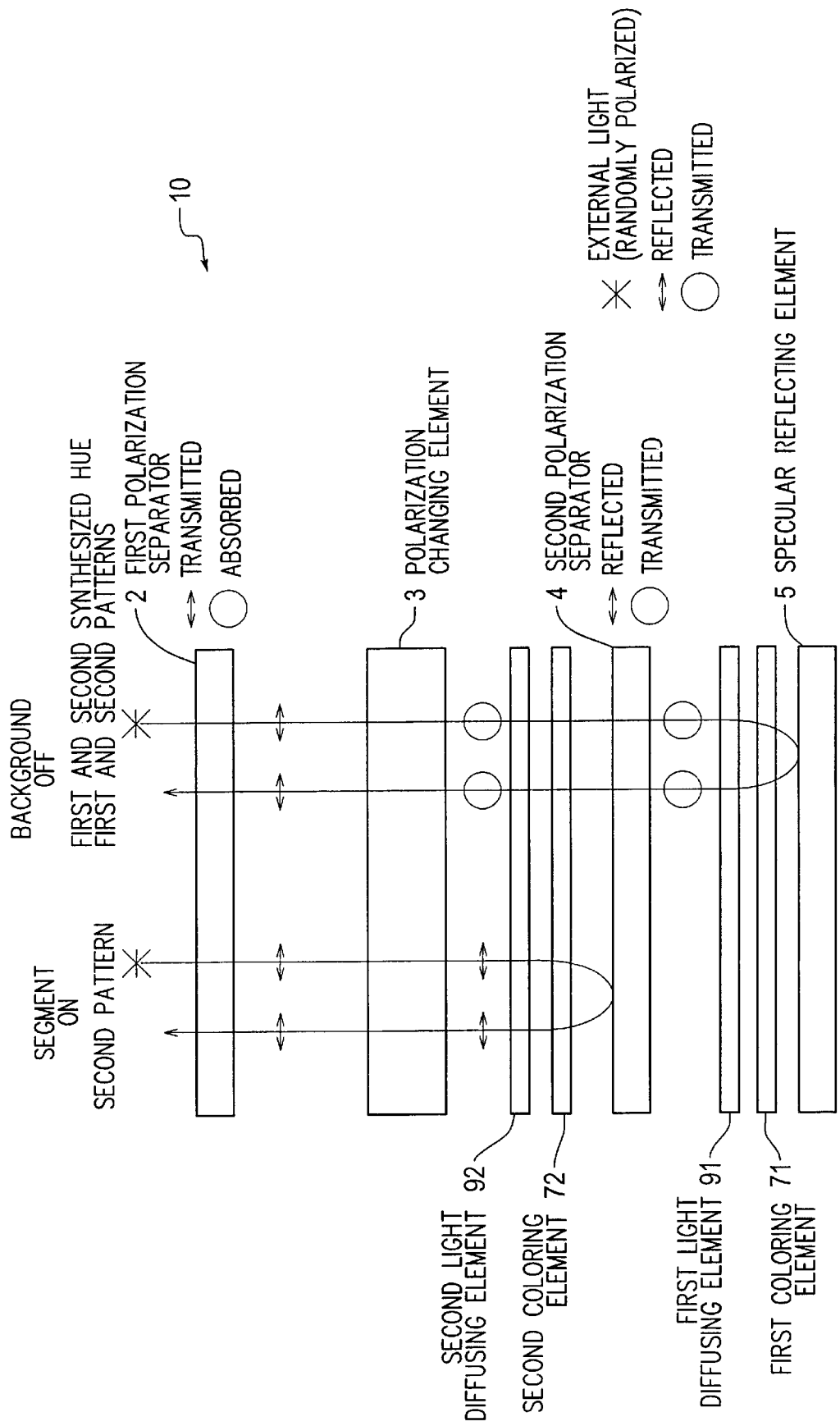
FIG. 15 is a diagrammatic view showing the construction of the display device of a sixth embodiment of the present invention.

FIG. 15 is a diagrammatic view showing the display device of a sixth embodiment of the present invention.

In the fifth embodiment, the segment portion, corresponding to the voltage applied (ON) area in the polarization axis varying means 3, is presented in a mirror-like image with a hue defined by the second coloration means 72. With the second light diffusing means 92 interposed between the polarization axis varying means 3 and the second polarizing splitter means 4 as shown in FIG. 15, the segment portion is presented with a hue defined by the second coloration means 72 and in a pattern imparted by the second light diffusing means 92. In contrast, the background portion, corresponding to the no voltage applied (OFF) area in the polarization axis varying means 3, is presented with a hue synthesized from the colors of the first coloration means 71 and the second coloration means 72 and in a pattern synthesized from the patterns imparted by the first light diffusing means 91 and the second light diffusing means 92.

In any embodiment, the order of the lamination of the first coloration means 71 and the first light diffusing means 91 may be reversed. Similarly, the order of the lamination of the second coloration means 72 and the second light diffusing means 92 may be reversed.

(Seventh Embodiment)

Figure 16:
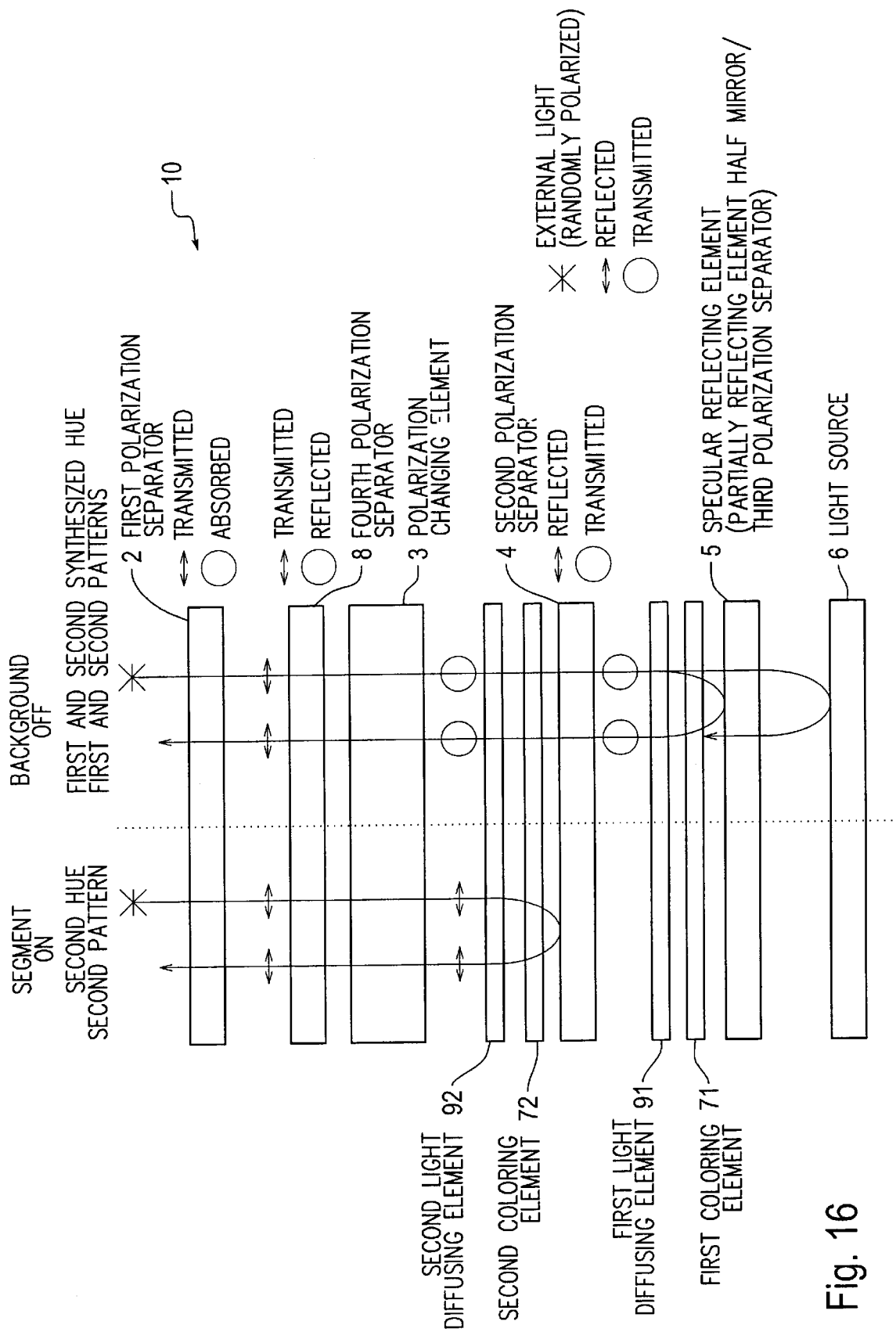
FIG. 16 is a diagrammatic view showing the construction of the display device of a seventh embodiment of the present invention.

FIG. 16 is a diagrammatic view of the display device of a seventh embodiment of the present invention.

In the display device 10 of each of the first through sixth embodiments, the specular reflective means 5 is the total reflection optical element which specularly reflects the total of or most of the incident linearly polarized light component. In this embodiment, as shown in FIG. 16, the specular reflective means 5 is a partially reflective optical element which specularly reflects part of the incident linearly polarized light component while transmitting the remaining light. This arrangement can be introduced in any of the first through sixth embodiments. Here in this embodiment, the partially reflective optical element is used as the specular reflective means 5 in the display device 10 in the sixth embodiment.

In this embodiment, the display device 10 of the present invention includes first polarizing splitter means 2 which transmits a linearly polarized light component, of an incident light ray, aligned in a first direction, polarization axis varying means 3 which selects one of a first state which varies the polarization axis of an incident linearly polarized light component when the incident linearly polarized light component is transmitted therethrough and a second state which does not vary the polarization axis when the incident linearly polarized light component is transmitted therethrough, second polarizing splitter means 4 which transmits a linearly polarized light component, of an incident light ray, aligned in a second direction, while reflecting a linearly polarized light component aligned in a third direction perpendicular to the second direction, and specular reflective means 5, which is disposed at a position diametrically opposite to the polarization axis varying means 3 with respect to the intervening second polarizing splitter means 4, and which specularly reflects a linearly polarized light component, transmitted through the second polarizing splitter means 4, toward the second polarizing splitter means 4, wherein the first polarizing splitter means 2, the polarization axis varying means 3, the second polarizing splitter means 4, and the specular reflective means 5 are arranged in that order. A light source 6 for backlighting is arranged diametrically opposite to the second polarizing splitter means 4 with respect to the intervening specular reflective means 5.

The specular reflective means 5 may be, for example, a half mirror (a partially reflective optical element) in which a metal thin film is formed on a light transmissive substrate. Also employed as the specular reflective means 5 is the polarizing splitter film 1 (the third polarization axis varying means) that is arranged to slightly deflect the polarization axis (the transmission axis) with respect to the second polarizing splitter means 4.

In this embodiment, the first coloration means 71 and the first light diffusing means 91 are arranged between the second polarizing splitter means 4 and the specular reflective means 5, and the second coloration means 72 and the second light diffusing means 92 are arranged between the polarization axis varying means 3 and the second polarizing splitter means 4. The seventh embodiment has a basic construction similar to that of the sixth embodiment.

In the reflective type display presented using the external light in this embodiment, the specular reflective means 5 is the partially reflective optical element, such as a half mirror, and part of the light incident on the specular reflective means 5 is transmitted therethrough toward the light source 6. The light, transmitted toward the light source 6, is reflected toward the specular reflective means 5 from the surface of the light source 6 in its sufficient light quantity to be used for displaying.

The display device 10 thus constructed employs the partially reflective optical element as the specular reflective means 5 for presenting a reflective type display based on the external light, and the light source 6 for backlighting is arranged behind the partially reflective optical element. Where the external light is not sufficient or during nighttime, the transmissive type display using the light source 6 may be presented.

Figure 17:
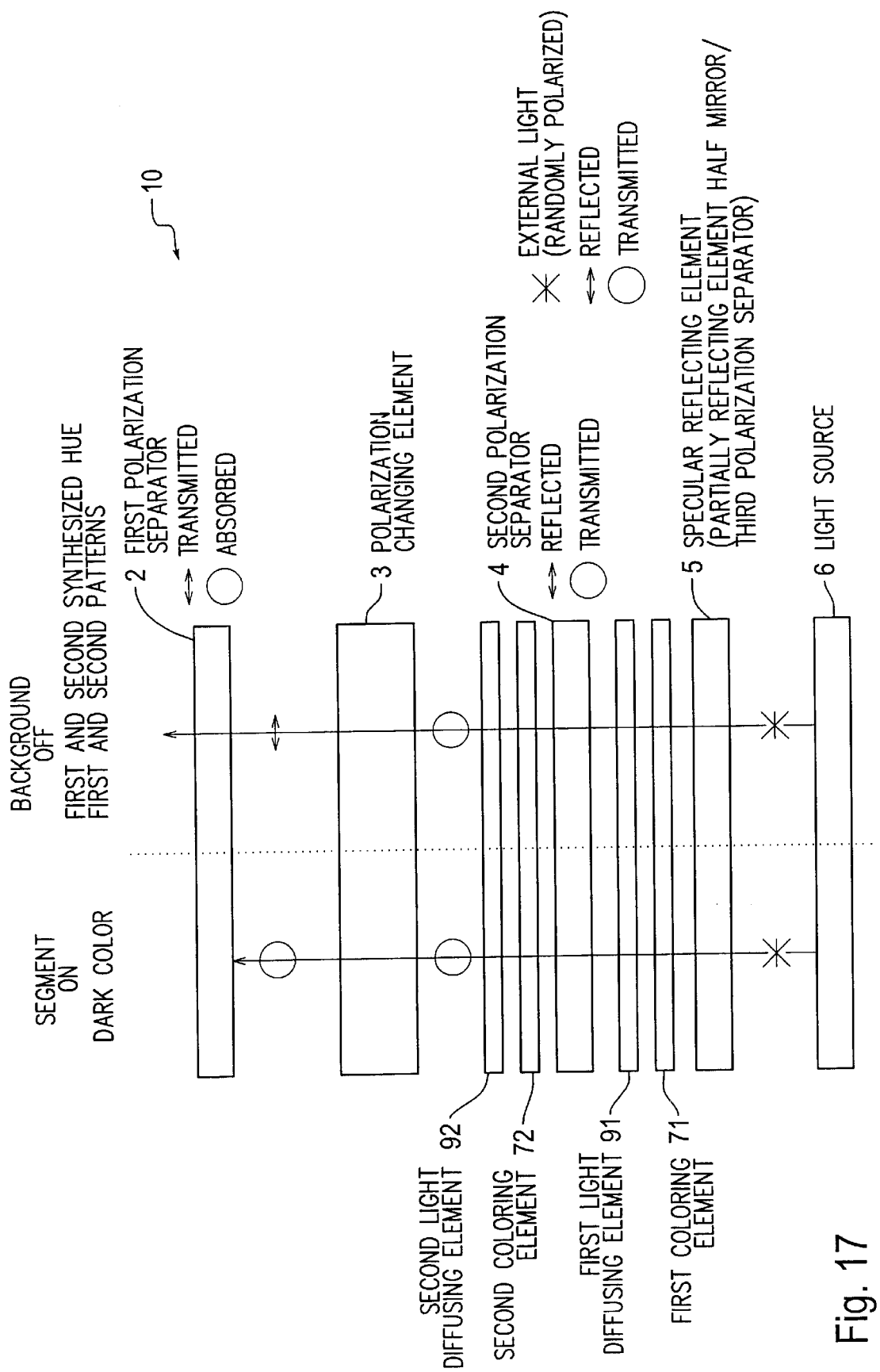
FIG. 17 is an explanatory view showing the operation of a transmissive type display using a light source for backlighting in the display device of FIG. 16.

Specifically, when the light source 6 is lit in the display device 10 of this embodiment as shown in FIG. 17, the light emitted from the light source 6 is transmitted through the reflective means 5 of semi-transmissive type, such as a half mirror, is also transmitted through the first coloration means 71 and the first light diffusing means 91, and is incident on the second polarizing splitter means 4. The second polarizing splitter means 4 transmits the linearly polarized light component aligned in the second direction, out of the incident linearly polarized light component, toward the polarization axis varying means 3, while specularly reflecting the linearly polarized light component aligned in the third direction perpendicular to the second direction. Specifically, out of the linearly polarized light component parallel to the page and the linearly polarized light component perpendicular to the page, incident on the second polarizing splitter means 4, the linearly polarized light component perpendicular to the page is transmitted through the second polarizing splitter means 4. The linearly polarized light component perpendicular to the page is therefore transmitted through the second coloration means 72 and the second light diffusing means 92, and is incident on the polarization axis varying means 3.

The area of the polarization axis varying means 3, corresponding to the background portion of the display screen of the electronic watch, is in an OFF state, while the segment portion for presenting information such as numerals is in an ON state. The linearly polarized light component aligned perpendicular to the page, incident on the voltage applied (ON) area, remains perpendicular to the page even after being transmitted therethrough, and is then not transmitted through the first polarizing splitter means 2. The segment portion is presented in an almost black, dark color under a dark lighting condition when the displaying from the reflection of the external light is not available.

In contrast, the area corresponding to the background portion of the electronic watch remains in an OFF state. The linearly polarized light ray aligned perpendicular to the page and incident on the no voltage applied (OFF) area is twisted in polarization direction by 90° by the TN liquid crystal, becoming a linearly polarized light ray parallel to the page, and is thus transmitted through the first polarizing splitter means 2. The background portion is thus presented with a hue synthesized from the colors of the first coloration means 71 and the second coloration means 72 and in a pattern synthesized from the patterns imparted by the first light diffusing means 91 and the second light diffusing means 92.

(Eighth Embodiment)

Figure 18:
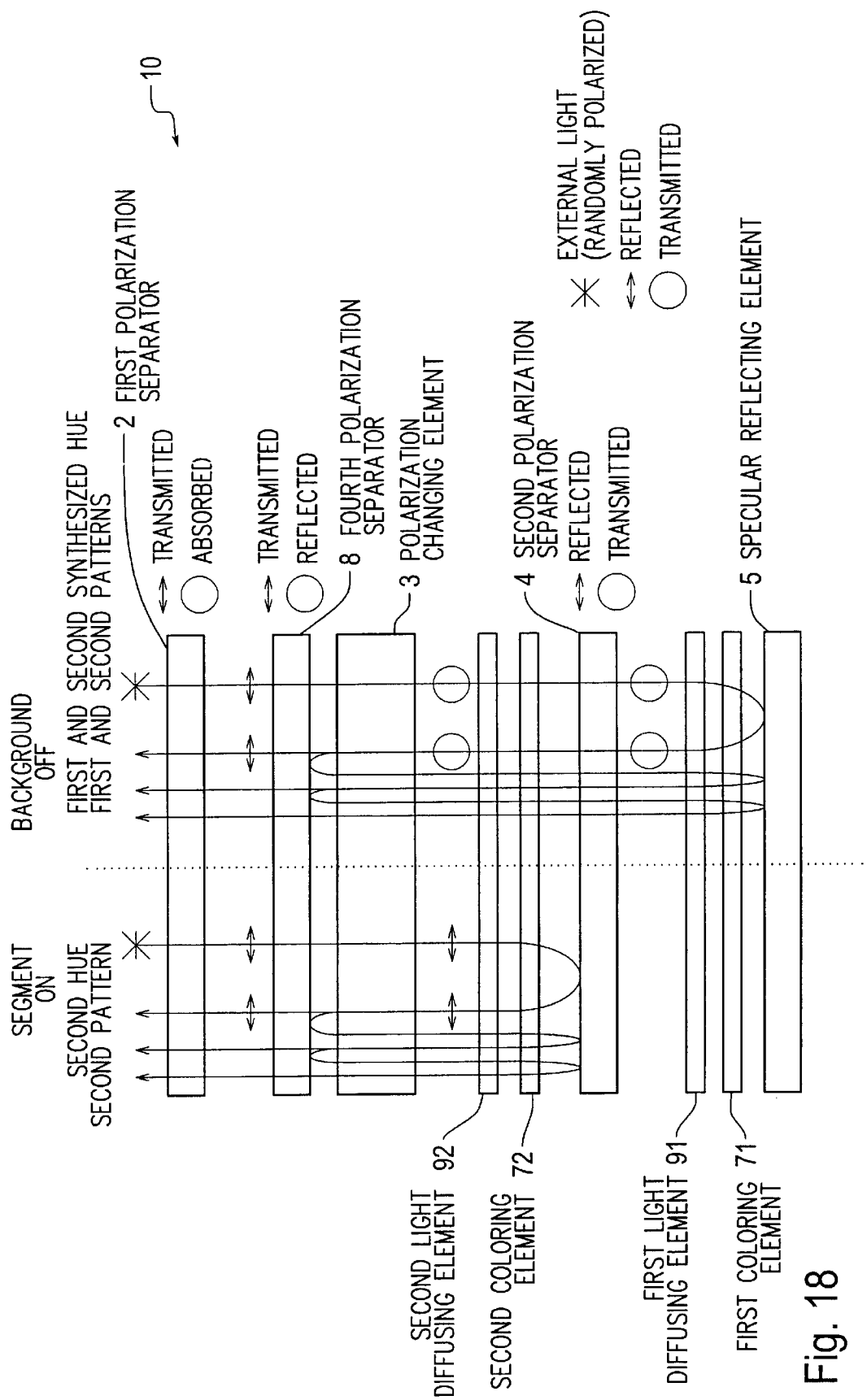
FIG. 18 is a diagrammatic view showing the construction of the display device of an eighth embodiment of the present invention.

FIG. 18 is a diagrammatic view of the display device of an eighth embodiment of the present invention. This embodiment may be implemented in any of the first through seventh embodiments.

Referring to FIG. 18, the display device of the present invention includes first polarizing splitter means 2 which transmits a linearly polarized light component, of an incident light ray, aligned in a first direction, polarization axis varying means 3 which selects one of a first state which varies the polarization axis of an incident linearly polarized light component when the incident linearly polarized light component is transmitted therethrough and a second state which does not vary the polarization axis when the incident linearly polarized light component is transmitted therethrough, second polarizing splitter means 4 which transmits a linearly polarized light component, of an incident light ray, aligned in a second direction, while reflecting a linearly polarized light component aligned in a third direction perpendicular to the second direction, and specular reflective means 5, which is disposed at a position diametrically opposite to the polarization axis varying means 3 with respect to the intervening second polarizing splitter means 4, and which specularly reflects a linearly polarized light component, transmitted through the second polarizing splitter means 4, toward the second polarizing splitter means 4, wherein the first polarizing splitter means 2, the polarization axis varying means 3, the second polarizing splitter means 4, and the specular reflective means 5 are arranged in that order. The specular reflective means 5 is a total reflection optical element as in the first through sixth embodiments.

Arranged between the first polarizing splitter means 2 and the polarization axis varying means 3 in this embodiment is fourth polarizing splitter means 8 which transmits a linearly polarized light component aligned in a sixth direction while reflecting a linearly polarized light component aligned in a seventh direction perpendicular to the sixth embodiment. The sixth direction here is the same direction as the first direction or is slightly deflected from the first direction. The polarizing splitter film 1 described with reference to FIG. 9 may be also used for the fourth polarizing splitter means 8.

Also in the display device 10 thus constructed, the first coloration means 71 and the first light diffusing means 91 are arranged between the second polarizing splitter means 4 and the specular reflective means 5, and the second coloration means 72 and the second light diffusing means 92 are arranged between the polarization axis varying means 3 and the second polarizing splitter means 4. The seventh embodiment has a basic construction similar to that of the sixth embodiment. As in the display device 10 of the sixth embodiment described with reference to FIG. 15, in the displaying operation of the display device 10 of this embodiment, the segment portion, corresponding to the voltage applied (ON) area in the polarization axis varying means 3, is presented with a hue determined by the first coloration means 71 and in a pattern imparted by the second light diffusing means 92. In contrast, the background portion, corresponding to the no voltage applied (OFF) area in the polarization axis varying means 3, is thus presented with a hue synthesized from the colors of the first coloration means 71 and the second coloration means 72 and in a pattern synthesized from the patterns imparted by the first light diffusing means 91 and the second light diffusing means 92.

In the display device of this embodiment, out of the first returning light which is reflected from the specular reflective means 5, and transmitted through the second polarizing splitter means 4 and then the polarization axis varying means 3, and the second returning light ray which is reflected from the second polarizing splitter means 4, and then transmitted through the polarization axis varying means 3, there is a linearly polarized light component which cannot be transmitted through the first polarizing splitter means 2 because the direction of its polarization axis is deflected from the direction (the first direction) in which the first polarizing splitter means 2 transmits linearly polarized light ray. This linearly polarized light component is reflected from the fourth polarizing splitter means 8, is again transmitted through the polarization axis varying means 3, and is again reflected from the specular reflective means 5 or the second polarizing splitter means 4. If a linearly polarized light component has failed to be transmitted through the first polarizing splitter means 2 in this way, the linearly polarized light component, reflected from the fourth polarizing splitter means 8, is subject to repeated reflection between the fourth polarizing splitter means 8 and the specular reflective means 5, and between the fourth polarizing splitter means 8 and the second polarizing splitter means 4. In the course of the repeated reflections, the linearly polarized light component becomes aligned with the polarization axis of the fourth polarizing splitter means 8, because of the rotation of the polarization axis due to a slight scattering of light on the surface of the coloration means and the polarizing splitter means, and the rotation of the polarization axis due to the reflection from the light diffusing means, if used. The linearly polarized light component is thus transmitted through the fourth polarizing splitter means 8 and the first polarizing splitter means 2. For this reason, the linearly polarized light component, which has failed to be transmitted through the first polarizing splitter means 2 because of the deflection of its polarization axis from the direction (the first direction) in which the first polarizing splitter means 2 transmits light ray, is then transmitted through the first polarizing splitter means 2, and reaches the eye of the user. A bright display is thus provided.

In the conventional display device, a shadow is caused by a lit segment. When directly viewed from its front, the shadow appears relatively small, but when viewed at a slant angle, a dark and large shadow is visible. As a result, no clear line is drawn between the segment and the shadow. This is one of the reasons for a narrow viewing angle. With the fourth polarizing splitter means 8 introduced between the first polarizing splitter means 2 and the polarization axis varying means 3 in this embodiment, no shadow is visible. The outline of each segment becomes clear, and a sharp segment is thus presented. An easy-to-see and high legibility display device thus results.

(Ninth Embodiment)

Figure 19:
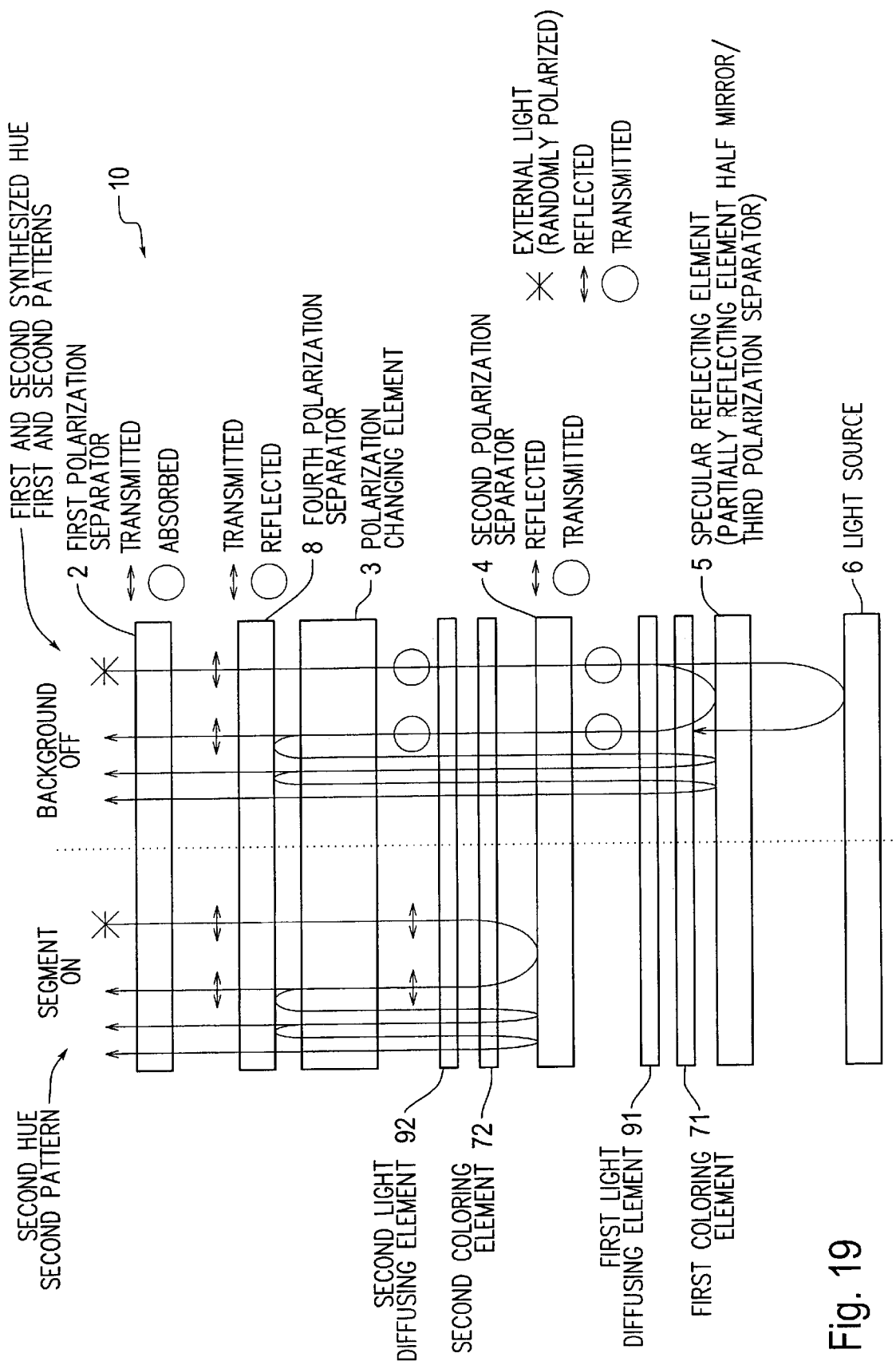
FIG. 19 is a diagrammatic view showing the construction of the display device of a ninth embodiment of the present invention.

FIG. 19 is a diagrammatic view showing the display device of a ninth embodiment of the present invention.

As discussed in connection with the eighth embodiment, a bright display is presented with the fourth polarizing splitter means 8 interposed between the first polarizing splitter means 2 and the polarization axis varying means 3. The same is true in the display device 10 with the partially reflective optical element used for the specular reflective means 5. As shown in FIG. 19, the linearly polarized light component, which has failed to be transmitted through the first polarizing splitter means 2, is reflected from the fourth polarizing splitter means 8, is subject to repeated reflection between the fourth polarizing splitter means 8 and the specular reflective means 5, and between the fourth polarizing splitter means 8 and the second polarizing splitter means 4. When its polarization axis becomes aligned with the first direction in the course of the repeated reflections, the linearly polarized light component is transmitted through the first polarizing splitter means 2, reaching the eye of the user. A bright display thus results.

When the transmissive type display is presented using the light source 6 for backlighting in the display device 10, the display becomes brighter thanks to the fourth polarizing splitter means 8 arranged between the first polarizing splitter means 2 and the polarization axis varying means 3.

Figure 20:
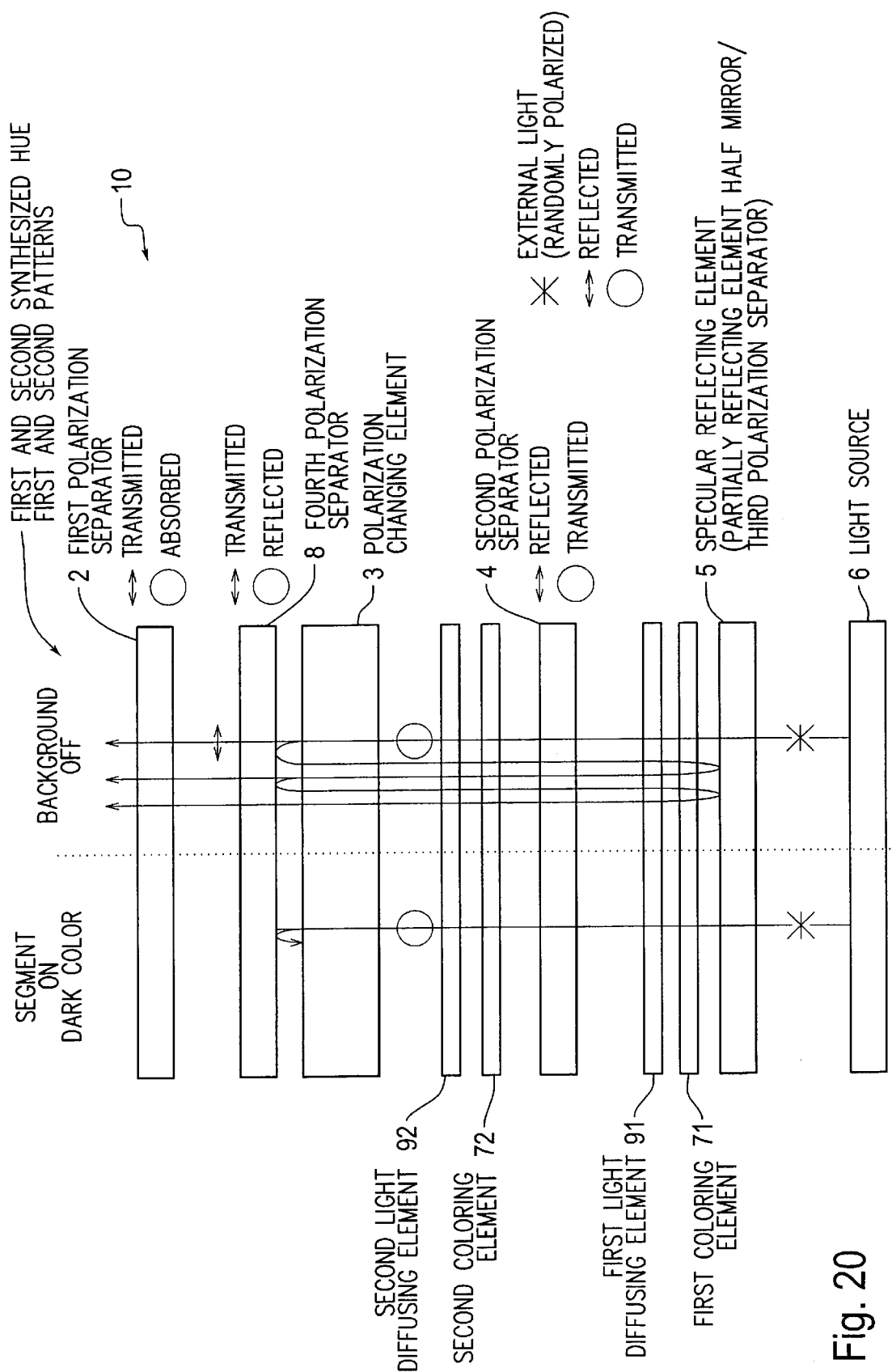
FIG. 20 is an explanatory view showing the operation of a transmissive type display using a light source for backlighting in the display device of FIG. 19.

Specifically, as shown in FIG. 20, the linearly polarized light component is emitted from the backlighting light source 6, and transmitted through the second polarizing splitter means 4 and the polarization axis varying means 3. In the background portion, corresponding to the no voltage applied (OFF) area in the polarization axis varying means 3, the linearly polarized light component which cannot be transmitted through the first polarizing splitter means 2 because of its polarization axis deflected from the first direction is then reflected from the fourth polarizing splitter means 8, again transmitted through the polarization axis varying means 3, and again reflected from the second polarizing splitter means 4. In this way, the linearly polarized light component, which has failed to be transmitted through the first polarizing splitter means 2, is reflected from the fourth polarizing splitter means 8, and is repeatedly reflected between the second polarizing splitter means 4 and the fourth polarizing splitter means 8. In the course of repeated reflections, its polarization axis becomes aligned with the first direction. Therefore, even if the linearly polarized light component has failed to be transmitted through the first polarizing splitter means 2 because of the deflection of its polarization axis from the first direction, it finally reaches the eye of the user. A brighter display thus results.

The display device and the electronic watch for achieving the second object of the present invention are constructed using the optical components identical to those used in the display device and the electronic watch for achieving the first object of the present invention. In the drawings showing the embodiments, the components are shown apart, but in practice, the components are attached together.

(Tenth Embodiment)

Figure 21:
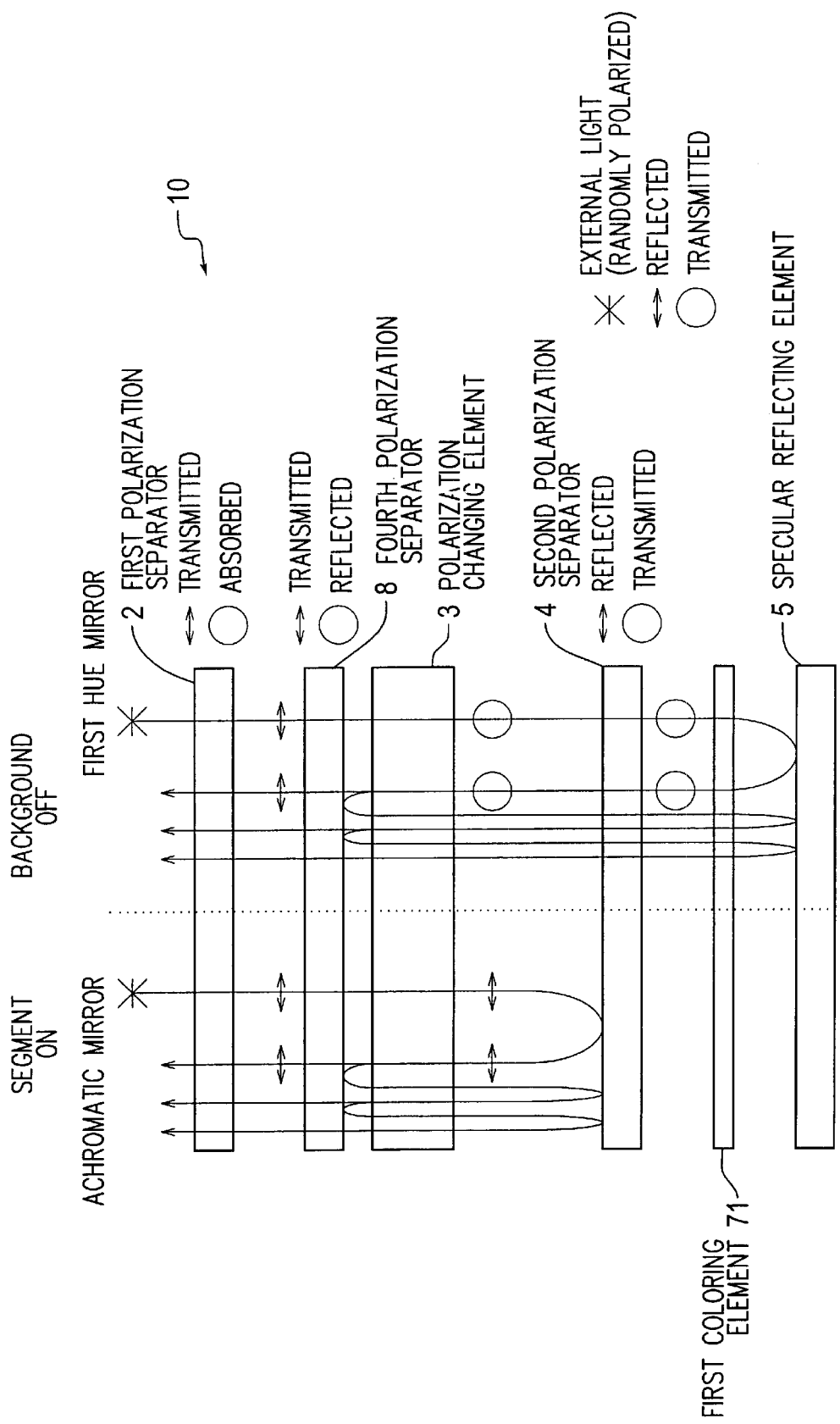
FIG. 21 is a diagrammatic view showing the construction of the display device of a tenth embodiment of the present invention.

FIG. 21 is a diagrammatic view showing the display device of a tenth embodiment of the present invention.

Referring to FIG. 21, the display device 10 of the present embodiment includes first polarizing splitter means 2 which transmits a linearly polarized light component, of an incident light ray, aligned in a first direction, polarization axis varying means 3 which selects one of a first state which varies the polarization axis of an incident linearly polarized light component when the incident linearly polarized light component is transmitted therethrough and a second state which does not vary the polarization axis when the incident linearly polarized light component is transmitted therethrough, second polarizing splitter means 4 which transmits a linearly polarized light component, of an incident light ray, aligned in a second direction, and reflective means 5, which reflects a linearly polarized light component, transmitted through the second polarizing splitter means 4, toward the second polarizing splitter means 4, wherein the first polarizing splitter means 2, the polarization axis varying means 3, the second polarizing splitter means 4, and the reflective means 5 are arranged in that order.

The second polarizing splitter means 4 is designed to specularly transmit a linearly polarized light component aligned in a third direction perpendicular to the second direction. The reflective means 5 is a total reflection optical element for reflecting the total of or most of an incident light ray. Furthermore, a first coloration means 71 for coloring an incident light to output a colored light ray is arranged between the reflective means 5 and the second polarizing splitter means 4.

Arranged between the first polarizing splitter means 2 and the polarization axis varying means 3 in this embodiment is fourth polarizing splitter means 8. The fourth polarizing splitter means 8 transmits a linearly polarized light component, aligned in the same direction as the first direction (the direction of the polarization axis of the linearly polarized light component that is transmitted through the first polarizing splitter means 2), out of an incident light ray, or transmits a linearly polarized light component which is slightly deflected from the first direction. The fourth polarizing splitter means 8 reflects a linearly polarized light component aligned perpendicular thereto. As described in connection with the display device for achieving the first object of the present invention, the polarizing splitter film 1, described with reference to FIG. 9, is also used for the fourth polarizing splitter means 8.

The display device 10 thus constructed displays predetermined information using a first returning light ray which is reflected from the reflective means 5, and transmitted through the second polarizing splitter means 4, the polarization axis varying means 3, and the first polarizing splitter means 2, and a second light ray which is reflected from the second polarizing splitter means 4, and transmitted through the polarization axis varying means 3 and the first polarizing splitter means 4, out of light rays which come in on the first polarizing splitter means 2 from the side of the first polarizing splitter means 2 diametrically opposite to the polarization axis varying means 3.

The displaying operation of the electronic watch is now discussed in detail. The electronic watch presents a reflective type display making use of the external light where the external light is available. To present the background on the display screen of the electronic watch, the liquid crystal (the polarization axis varying means 3) in the corresponding area is set to an OFF state. To present information such as numerals in the segment portion on the display screen, the liquid crystal in the corresponding area is set to an ON state.

When the external light is incident on the electronic watch under this condition, a linearly polarized light component, aligned parallel to the page, out of the external light, is transmitted through the first polarizing splitter means 2 while a linearly polarized light component aligned vertical to the page is absorbed by the first polarizing splitter means 2.

In the no voltage applied (OFF) area in the polarization axis varying means 3, the linearly polarized light component aligned parallel to the page is twisted in polarization direction by 90° by the TN liquid crystal, becoming a linearly polarized light component aligned perpendicular to the page. The linearly polarized light component then reaches the second polarizing splitter means 4.

The linearly polarized light component aligned perpendicular to the page is then transmitted through the second polarizing splitter means 4 and the first coloration means 71, and reaches the reflective means 5.

The linearly polarized light component aligned perpendicular to the page is then reflected from the reflective means 5, transmitted through the second polarizing splitter means 4, and incident on the polarization axis varying means 3. The linearly polarized light component incident on the polarization axis varying means 3 is again twisted in polarization direction by 90° by the TN liquid crystal, becoming a linearly polarized light component aligned parallel to the page. The first returning light reflected from the reflective means 5 is thus output from the first polarizing splitter means 2 as a linearly polarized light ray aligned parallel to the page. For this reason, the background portion is presented in a mirror-like image with a chromatic color defined by the first coloration means 71.

In contrast, in the voltage applied (ON) area, the linearly polarized light component aligned parallel to the page, out of the external light, transmitted through the first polarizing splitter means 2, is output from the polarization axis varying means 3 with its polarization axis unchanged through the TN liquid crystal, and reaches the second polarizing splitter means 4. The linearly polarized light component aligned parallel to the page is reflected from the second polarizing splitter means 4. Since the second polarizing splitter means 4 here is constructed of the polarizing splitter film 1 described with reference to FIG. 9 in the discussion of the display device for achieving the first object of the present invention, the light ray from the polarization axis varying means 3 is specularly reflected from the second polarizing splitter means 4.

The linearly polarized light component aligned parallel to the page, reflected from the second polarizing splitter means 4 (the second returning light) is incident on the polarization axis varying means 3. The linearly polarized light component incident on the polarization axis varying means 3 is output with its polarization axis unchanged, as a linearly polarized light component aligned parallel to the page. The second returning light reflected from the second polarizing splitter means 4 thus exits from the first polarizing splitter means 2 as a linearly polarized light component aligned parallel to the page. The segment portion is therefore presented in an achromatic color mirror-like image.

In this embodiment, the light rays, which are transmitted through the area of the polarization axis varying means 3 which varies the polarization axis and the area of the polarization axis varying means 3 which does not vary the polarization axis, reach the eye of the user, respectively as the linearly polarized light ray (the first returning light) which is reflected from the reflective means 5, and transmitted through the second polarizing splitter means 4, the polarization axis varying means 3, and the first polarizing splitter means 2 and the linearly polarized light ray (the second returning light) which is reflected from the second polarizing splitter means 4, and transmitted through the polarization axis varying means 3 and the first polarizing splitter means 2. Both the background portion and the segment portion can therefore be brightly presented in the electronic watch or the like. Thus, the legibility of the display is advantageously high. Since both the first returning light and the second returning light are reflected light rays, a high degree of flexibility is assured in the combination of display modes, in which both the background portion and the segment portion are presented in a mirror-like image. Specifically, the electronic watch may provide a display mode with both the background portion and the segment portion presented in a mirror-like glossy image, a display mode with both the background portion and the segment portion presented in a matte image, or a display mode with one of the background portion and the segment portion in a mirror-like image and the other in a matte image.

The display device 10 of this embodiment results in the first returning light, which is reflected from the reflective means 5 and transmitted through the second polarizing splitter means 4 and the polarization axis varying means 3, and the second returning light, which is reflected from the second polarizing splitter means 4 and transmitted through the polarization axis varying means 3. Out of theses light rays, a linearly polarized light component is unable to be transmitted through the first polarizing splitter means 2 because of the deflection of its polarization axis from the direction (the first direction) in which the first polarizing splitter means 2 transmits light, reflected from the fourth polarizing splitter means 8, again transmitted through the polarization axis varying means 3, and again reflected from the reflective means 5 or the second polarizing splitter means 4. In this way, even the linearly polarized light component, which has failed to be transmitted through the first polarizing splitter means 2, is reflected from the fourth polarizing splitter means 8, and is repeatedly reflected between the fourth polarizing splitter means 8 and the reflective means 5 and between fourth polarizing splitter means 8 and the second polarizing splitter means 4. In the course of the repeated reflections, the linearly polarized light component may become aligned with the polarization axis of the fourth polarizing splitter means 8, because of the rotation of the polarization axis due to a slight scattering of light on the surface of the coloration means and the polarizing splitter means, or the rotation of the polarization axis due to the reflection from the light diffusing means, if used as described later. The linearly polarized light component is subsequently transmitted through the fourth polarizing splitter means 8 and the first polarizing splitter means 2. For this reason, the linearly polarized light component, which has failed to be transmitted through the first polarizing splitter means 2 because of the deflection of its polarization axis from the first direction in which the first polarizing splitter means 2 transmits light, is subsequently transmitted through the first polarizing splitter means 2, and reaches the eye of the user. A bright display is thus provided. In the conventional display device, a shadow is caused by a lit segment. When directly viewed from its front, the shadow appears relatively small, but when viewed at a slant angle, a dark and large shadow is visible. As a result, no clear line is drawn between the segment and the shadow. This is one of the reasons for a narrow viewing angle. With the fourth polarizing splitter means 8 introduced between the first polarizing splitter means 2 and the polarization axis varying means 3 in this embodiment, no shadow is visible. The outline of each segment becomes clear, and a sharp segment is thus presented. An easy-to-see and high legibility display device thus results.

If the angle between the direction of the polarization axis of the linearly polarized light component transmitted through the fourth polarizing splitter means 8 and the first direction is 20° or smaller, the effectiveness of this arrangement is sufficiently recognizable in providing a bright display. If the angle between the direction of the polarization axis of the linearly polarized light component transmitted through the fourth polarizing splitter means 8 and the first direction is set to be 5° or smaller, the display is substantially brightened.

(Eleventh Embodiment)

Figure 22:
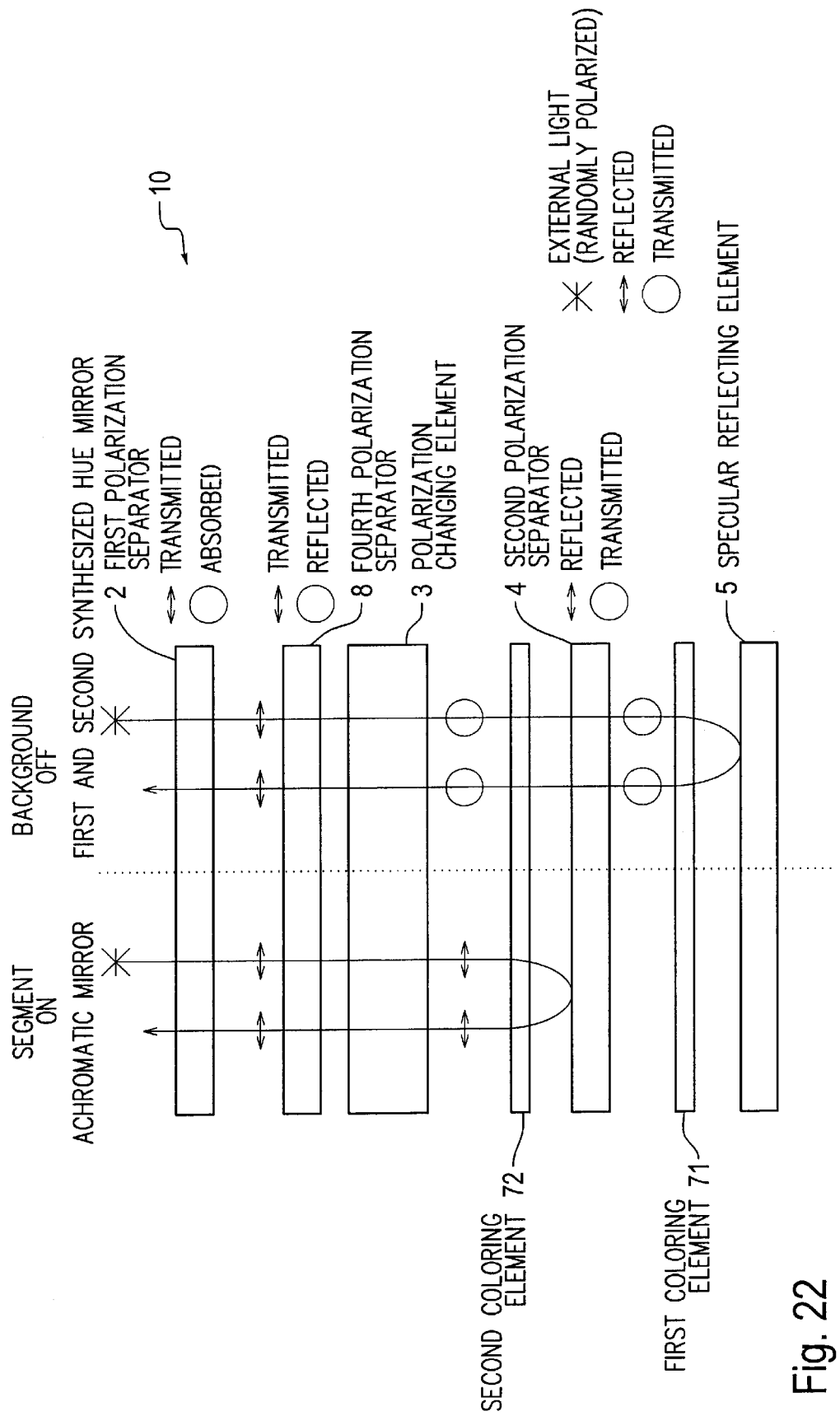
FIG. 22 is a diagrammatic view showing the construction of the display device of an eleventh embodiment of the present invention.

FIG. 22 is a diagrammatic view showing the display device of an eleventh embodiment of the present invention.

In the tenth embodiment, the segment portion, corresponding to the voltage applied (ON) area in the polarization axis varying means 3, is presented in an achromatic color mirror-like image. If second coloration means 72 is interposed between the polarization axis varying means 3 and the second polarizing splitter means 4 as shown in FIG. 22, the segment portion is presented in a mirror-like image with a hue determined by the second coloration means 72. The background portion, corresponding to the no voltage applied (OFF) area in the polarization axis varying means 3, is then presented in a mirror-like image with a hue synthesized from the colors provided by the first coloration means 71 and the second coloration means 72.

In the display device 10 thus constructed, fourth polarizing splitter means 8 is arranged between the first polarizing splitter means 2 and the polarization axis varying means 3. The fourth polarizing splitter means 8 transmits a linearly polarized light component aligned in the same direction as the first direction (the direction of the polarization axis of the linearly polarized light component transmitted through the first polarizing splitter means 2) or transmits a linearly polarized light component slightly deflected from the first direction, while reflecting a linearly polarized light component aligned perpendicular thereto. With this arrangement, even the linearly polarized light component, which has failed to be transmitted through the first polarizing splitter means 2, is reflected from the fourth polarizing splitter means 8, and is repeatedly reflected between the fourth polarizing splitter means 8 and the reflective means 5 and between fourth polarizing splitter means 8 and the second polarizing splitter means 4. When the direction of the polarization axis becomes aligned with the first direction in the course of the repeated reflections, the linearly polarized light component reaches the eye of the user. A bright display is thus provided.

(Twelfth Embodiment)

Figure 23:
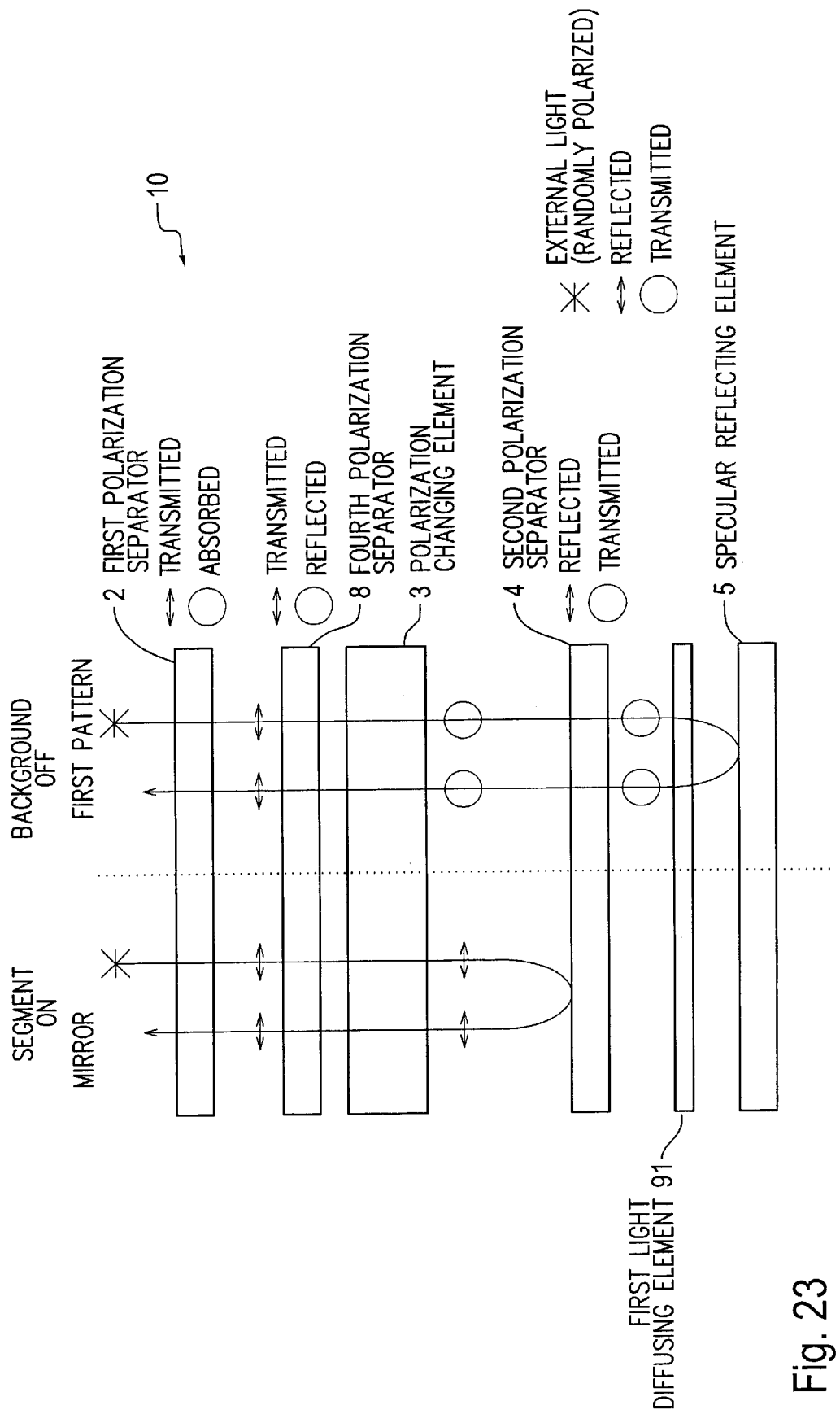
FIG. 23 is a diagrammatic view showing the construction of the display device of a twelfth embodiment of the present invention.

FIG. 23 is a diagrammatic view showing the display device of a twelfth embodiment of the present invention.

Referring to FIG. 23, first light diffusing means 91 is arranged between the second polarizing splitter means 4 and the reflective means 5 but no coloration means is arranged therebetween. With this arrangement, the segment portion is presented in an achromatic color mirror-like image, but the background portion is presented in a fine pattern such as a texture provided by the first light diffusing means 91, rather than in a mirror-like image.

Like the first and second embodiments, the display device 10 thus constructed includes fourth polarizing splitter means 8 between the first polarizing splitter means 2 and the polarization axis varying means 3. In this way, even the linearly polarized light component, which has failed to be transmitted through the first polarizing splitter means 2, is reflected from the fourth polarizing splitter means 8, and is repeatedly reflected between the fourth polarizing splitter means 8 and the reflective means 5 and between fourth polarizing splitter means 8 and the second polarizing splitter means 4. When the polarization axis becomes aligned with the first direction in the course of the repeated reflections, the linearly polarized light component is transmitted through the first polarizing splitter means 2 and reaches the eye of the user, providing a bright display.

(Thirteenth Embodiment)

Figure 24:
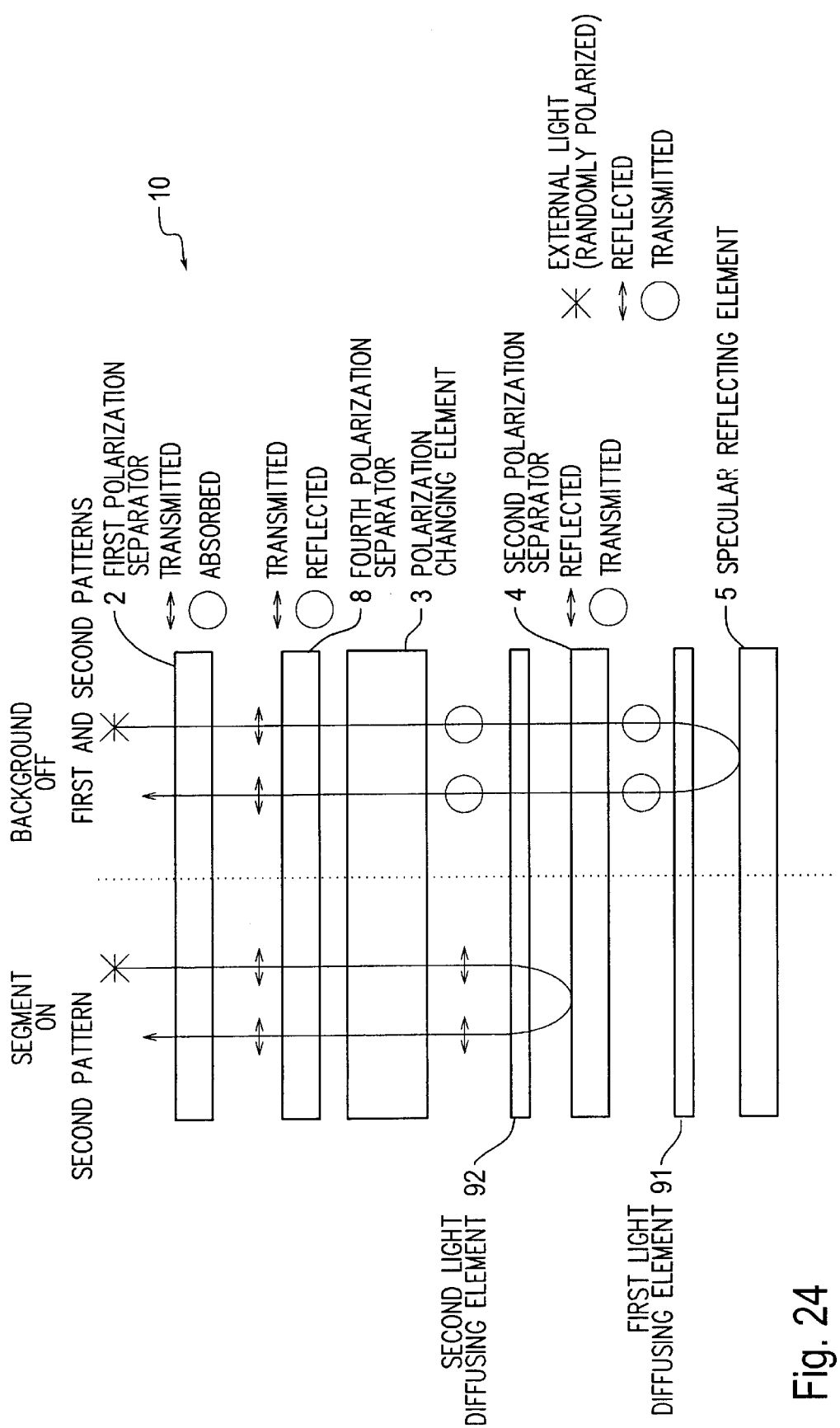
FIG. 24 is a diagrammatic view showing the construction of the display device of a thirteenth embodiment of the present invention.

FIG. 24 is a diagrammatic view showing the display device of a thirteenth embodiment of the present invention.

In the twelfth embodiment, the segment portion, corresponding to the voltage applied (ON) area in the polarization axis varying means 3, is presented in an achromatic color mirror-like image. However, if second light diffusing means 92 is interposed between the polarization axis varying means 3 and the second polarizing splitter means 4 as shown in FIG. 24, the segment portion is presented in a fine pattern of a texture provided by the second light diffusing means 92. The background portion, corresponding to the no voltage applied (OFF) area in the polarization axis varying means 3, is presented in a pattern synthesized from the patterns provided by the first light diffusing means 91 and the second light diffusing means 92.

Like the first and second embodiments, the display device 10 thus constructed includes fourth polarizing splitter means 8 between the first polarizing splitter means 2 and the polarization axis varying means 3. In this way, even the linearly polarized light component, which has failed to be transmitted through the first polarizing splitter means 2, is reflected from the fourth polarizing splitter means 8, and is repeatedly reflected between the fourth polarizing splitter means 8 and the reflective means 5 and between fourth polarizing splitter means 8 and the second polarizing splitter means 4. When the polarization axis becomes aligned with the first direction in the course of the repeated reflections, the linearly polarized light component is transmitted through the first polarizing splitter means 2 and reaches the eye of the user, providing a bright display.

(Fourteenth Embodiment)

Figure 25:
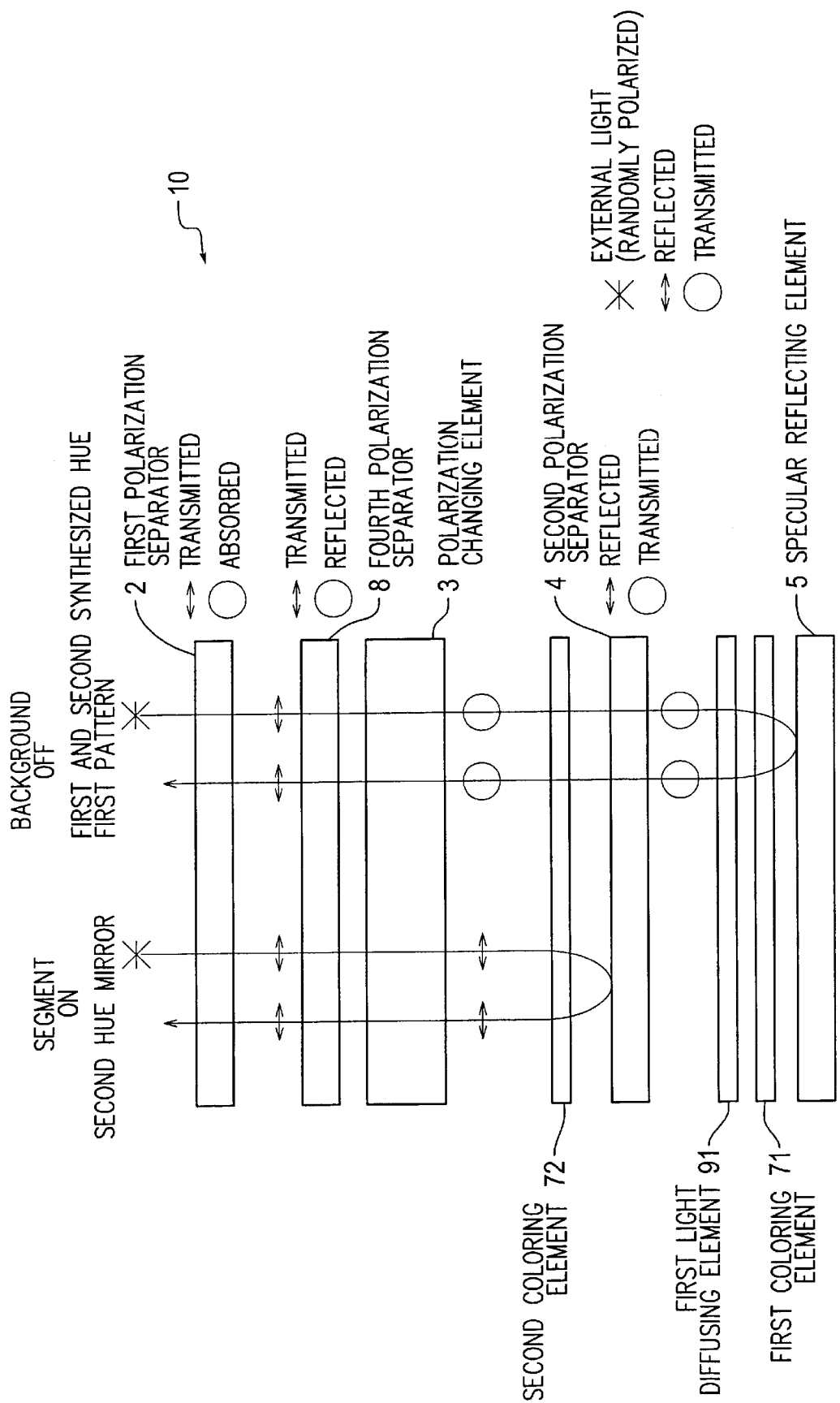
FIG. 25 is a diagrammatic view showing the construction of the display device of a fourteenth embodiment of the present invention.

FIG. 25 is a diagrammatic view showing the display device of a fourteenth embodiment of the present invention.

In the first through thirteenth embodiments, the segment portion, corresponding to the voltage applied (ON) area, and the background portion, corresponding to the no voltage applied (OFF) area, are differentiated by employing either one of the coloration means or the light diffusing means. The coloration means and the light diffusing means may be used in combination as described below.

Specifically, in this embodiment as shown in FIG. 25, the first coloration means 71 and the first light diffusing means 91 are interposed between the second polarizing splitter means 4 and the reflective means 5, and the second coloration means 72 is interposed between the polarization axis varying means 3 and the second polarizing splitter means 4. In this case, the order of the lamination of the first coloration means 71 and the first light diffusing means 91 may be reversed.

The display device 10 thus constructed presents the segment portion in a mirror-like image with a hue defined by the second coloration means 72. In contrast, the background portion, corresponding to the no voltage applied (OFF) are in the polarization axis varying means 3, is presented in a hue synthesized from the colors imparted by the first coloration means 71 and the second coloration means 72 and in a pattern imparted by the first light diffusing means 91.

Like the first and second embodiments, the display device 10 thus constructed includes fourth polarizing splitter means 8 between the first polarizing splitter means 2 and the polarization axis varying means 3. In this way, even the linearly polarized light component, which has failed to be transmitted through the first polarizing splitter means 2, is reflected from the fourth polarizing splitter means 8, and is repeatedly reflected between the fourth polarizing splitter means 8 and the reflective means 5 and between fourth polarizing splitter means 8 and the second polarizing splitter means 4. When the polarization axis becomes aligned with the first direction in the course of the repeated reflections, the linearly polarized light component is thus transmitted through the first polarizing splitter means 2 and reaches the eye of the user, providing a bright display.

(Fifteenth Embodiment)

Figure 26:
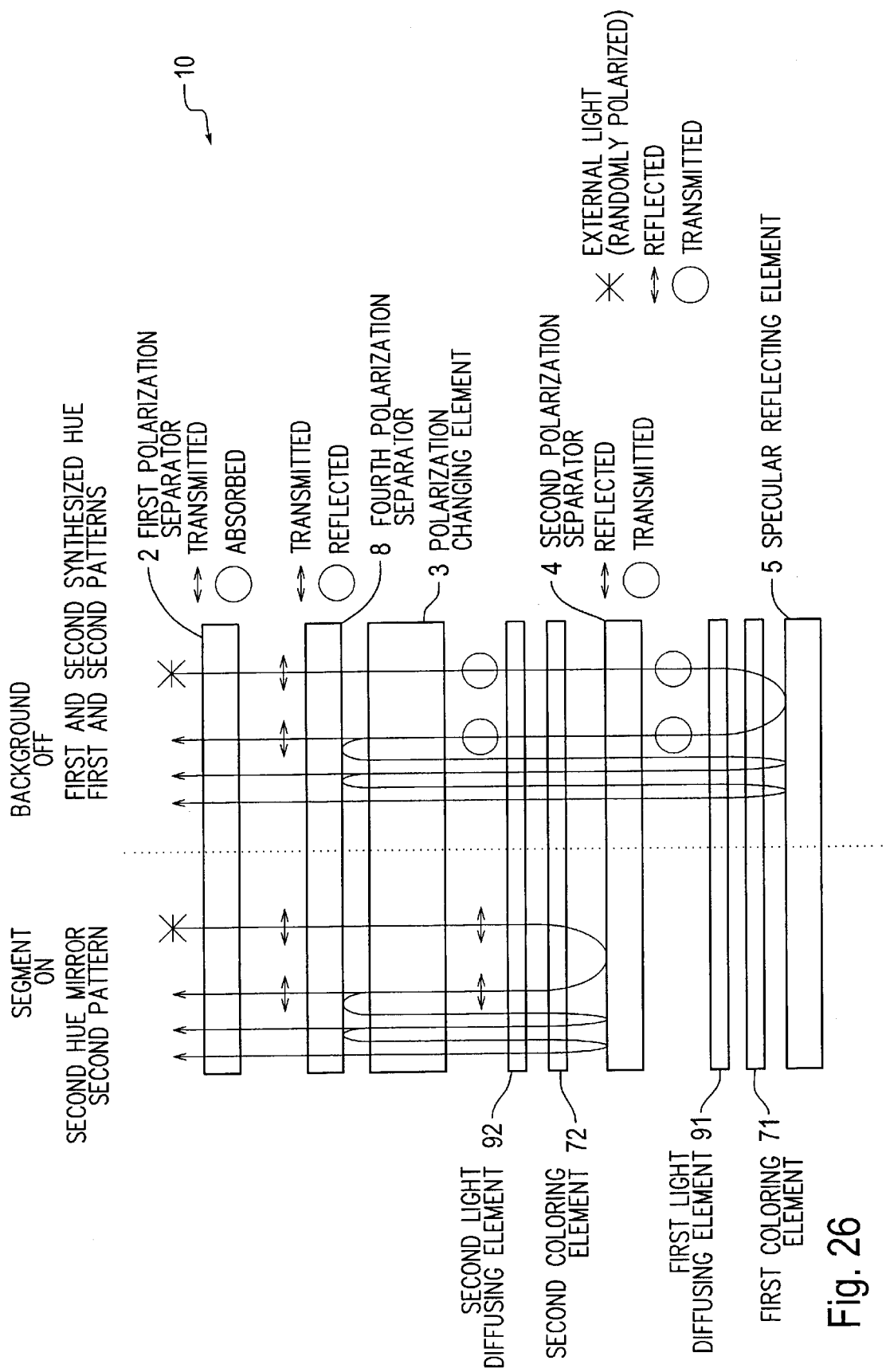
FIG. 26 is a diagrammatic view showing the construction of the display device of a fifteenth embodiment of the present invention.

FIG. 26 is a diagrammatic view showing the display device of a fifteenth embodiment of the present invention.

In the fourteenth embodiment, the segment portion, corresponding to the voltage applied (ON) area in the polarization axis varying means 3, is presented in a chromatic color mirror-like image. However, if the second light diffusing means 92 is interposed between the polarization axis varying means 3 and the second polarizing splitter means 4 as shown in FIG. 26, the segment portion is presented with a hue determined by the first coloration means 71 and in a pattern imparted by the second light diffusing means 92.

In contrast, the background portion, corresponding to the no voltage applied (OFF) area in the polarization axis varying means 3, is presented in a hue synthesized from the colors imparted by the first coloration means 71 and the second coloration means 72 and in a pattern synthesized from the patterns imparted by the first light diffusing means 91 and the second light diffusing means 92.

Like the first and second embodiments, the display device 10 thus constructed includes fourth polarizing splitter means 8 between the first polarizing splitter means 2 and the polarization axis varying means 3. In this way, even the linearly polarized light component, which has failed to be transmitted through the first polarizing splitter means 2, is reflected from the fourth polarizing splitter means 8, and is repeatedly reflected between the fourth polarizing splitter means 8 and the reflective means 5 and between fourth polarizing splitter means 8 and the second polarizing splitter means 4. When the polarization axis becomes aligned with the first direction in the course of the repeated reflections, the linearly polarized light component is transmitted through the first polarizing splitter means 2 and reaches the eye of the user, providing a bright display.

In any embodiment, the order of the lamination of the first coloration means 71 and the first light diffusing means 91 may be reversed. Similarly, the order of the lamination of the second coloration means 72 and the second light diffusing means 92 may be reversed.

(Sixteenth Embodiment)

Figure 27:
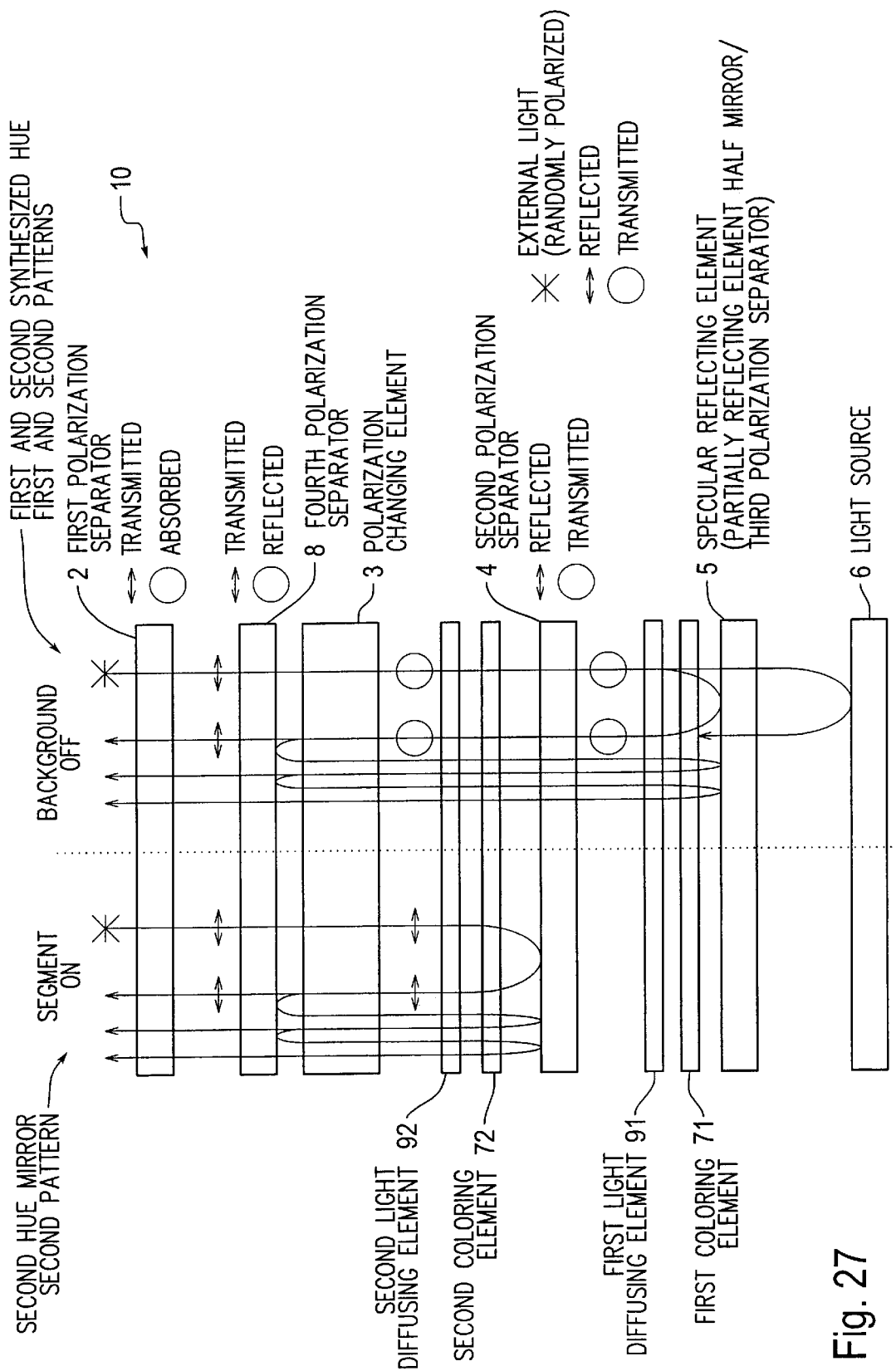
FIG. 27 is a diagrammatic view showing the construction of the display device of a sixteenth embodiment of the present invention.

FIG. 27 is a diagrammatic view showing the display device of a sixteenth embodiment of the present invention.

In the display device 10 of each of the tenth through fifteenth embodiments, the reflective means 5 is the total reflection optical element which reflects the total of or most of a linearly polarized light component. In this embodiment, as shown in FIG. 27, the reflective means 5 is a partially reflective optical element which specularly reflects part of the incident linearly polarized light component while transmitting the remaining light. This arrangement can be introduced in any of the first through sixth embodiments. Here in this embodiment, the partially reflective optical element is used as the specular reflective means 5 in the display device 10 in the fifteenth embodiment.

In this embodiment, the display device 10 of the present invention includes first polarizing splitter means 2 which transmits a linearly polarized light component, of an incident light ray, aligned in a first direction, polarization axis varying means 3 which selects one of a first state which varies a polarization axis of the incident linearly polarized light component when the incident linearly polarized light component is transmitted therethrough and a second state which does not vary the polarization axis when the incident linearly polarized light component is transmitted therethrough, second polarizing splitter means 4 which transmits a linearly polarized light component, of an incident light ray, aligned in a second direction, and reflective means 5, which reflects a linearly polarized light component, transmitted through the second polarizing splitter means 4, toward the second polarizing splitter means 4, wherein the first polarizing splitter means 2, the polarization axis varying means 3, the second polarizing splitter means 4, and the reflective means 5 are arranged in that order. A light source 6 for backlighting is arranged diametrically opposite to the second polarizing splitter means 4 with respect to the intervening reflective means 5.

The reflective means 5 may be, for example, a half mirror (a partially reflective optical element) in which a metal thin film is formed on a light transmissive substrate. Also employed as specular reflective means 5 is the polarizing splitter film 1 (the third polarization axis varying means) that is arranged to be slightly deflected from the polarization axis (the transmission axis) with respect to the second polarizing splitter means 4.

In this embodiment, the first coloration means 71 and the first light diffusing means 91 are arranged between the second polarizing splitter means 4 and the reflective means 5, and the second coloration means 72 and the second light diffusing means 92 are arranged between the polarization axis varying means 3 and the second polarizing splitter means 4. The sixteenth embodiment has a basic construction similar to that of the fifteenth embodiment.

In the reflective type display presented using the external light in this embodiment, the reflective means 5 is the partially reflective optical element, such as a half mirror, and part of the light incident on the reflective means 5 is transmitted therethrough toward the light source 6. The light, transmitted toward the light source 6, is reflected toward the reflective means 5 from the surface of the light source 6 in its sufficient light quantity to be used for displaying.

The display device 10 thus constructed includes fourth polarizing splitter means 8 between the first polarizing splitter means 2 and the polarization axis varying means 3. In this way, even the linearly polarized light component, which has failed to be transmitted through the first polarizing splitter means 2, is reflected from the fourth polarizing splitter means 8, and is repeatedly reflected between the fourth polarizing splitter means 8 and the reflective means 5 and between fourth polarizing splitter means 8 and the second polarizing splitter means 4. When the polarization axis becomes aligned with the first direction in the course of the repeated reflections, the linearly polarized light component is transmitted through the first polarizing splitter means 2 and reaches the eye of the user, providing a bright display.

The display device 10 thus constructed employs the partially reflective optical element as the reflective means 5 for presenting a reflective type display based on the external light, and the light source 6 for backlighting is arranged behind the partially reflective optical element. Where the external light is not sufficient or during nighttime, the transmissive type display using the light source 6 may be presented.

Figure 28:
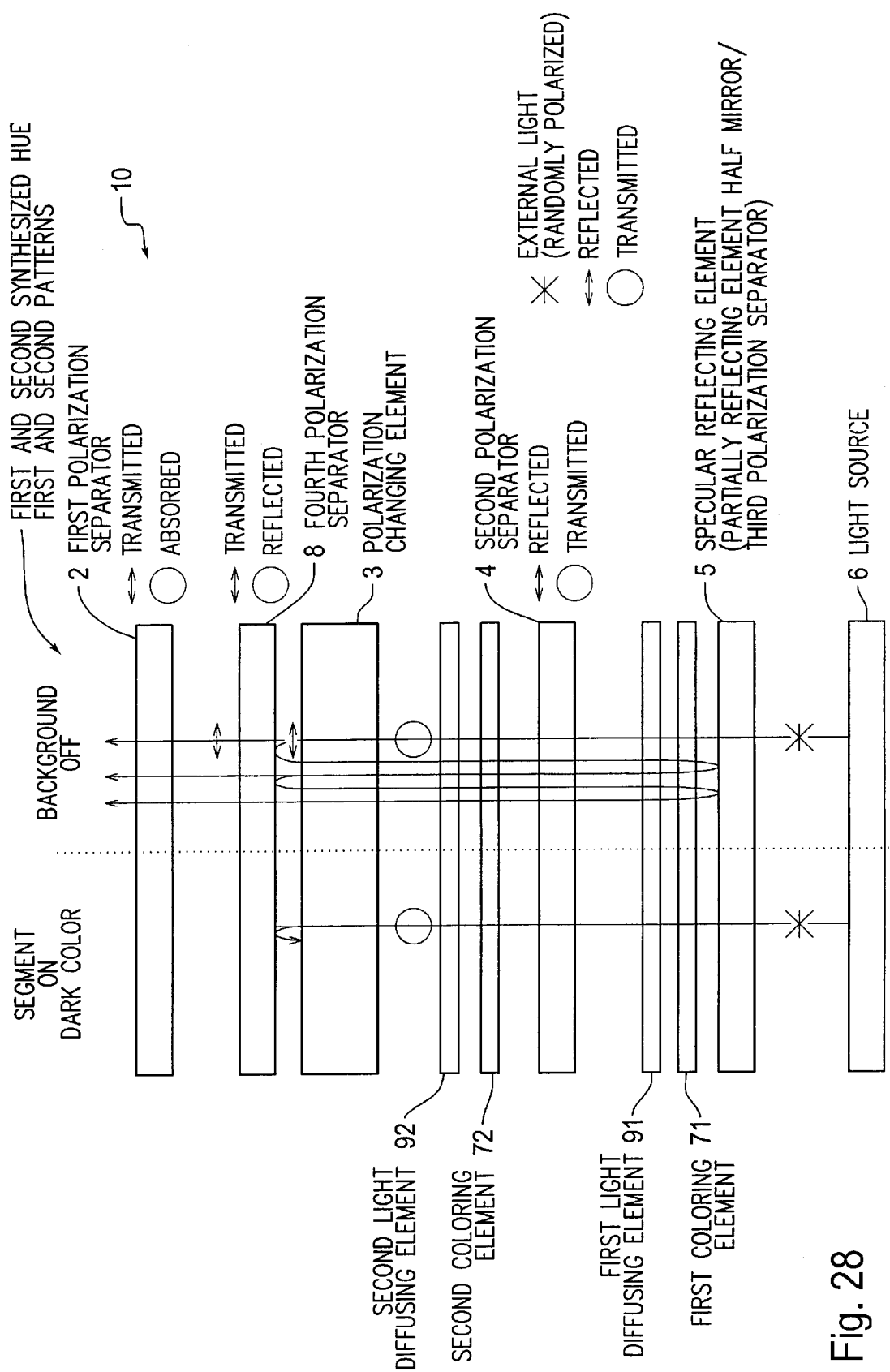
FIG. 28 is an explanatory view showing the operation of a transmissive type display using a light source for backlighting in the display device of FIG. 27.

Specifically, when the light source 6 is lit in the display device 10 of this embodiment as shown in FIG. 28, the light emitted from the light source 6, transmitted through the reflective means 5 of semi-transmissive type, such as a half mirror, is further transmitted through the first coloration means 71 and the first light diffusing means 91, and is incident on the second polarizing splitter means 4. The second polarizing splitter means 4 transmits the linearly polarized light component aligned in the second direction, out of the incident linearly polarized light component, toward the polarization axis varying means 3, while specularly reflecting the linearly polarized light component aligned in the third direction perpendicular to the second direction. Specifically, out of the linearly polarized light component parallel to the page and the linearly polarized light component perpendicular to the page, incident on the second polarizing splitter means 4, the linearly polarized light component perpendicular to the page is transmitted through the second polarizing splitter means 4. The linearly polarized light component perpendicular to the page is therefore transmitted through the second coloration means 72 and the second light diffusing means 92, and is incident on the polarization axis varying means 3.

The area of the polarization axis varying means 3, corresponding to the background portion of the display screen of the electronic watch, is in an OFF state, while the segment portion for presenting information such as numerals is in an ON state. The linearly polarized light component aligned perpendicular to the page, incident on the voltage applied (ON) area, remains perpendicular to the page even after being transmitted therethrough, and is then not transmitted through the first polarizing splitter means 2. The segment portion is presented in a dark color, which is almost black, under a dark lighting condition when the displaying from the reflection of the external light is not available.

In contrast, the area corresponding to the background portion of the electronic watch remains in an OFF state. The linearly polarized light ray aligned perpendicular to page and incident on the no voltage applied (OFF) area is twisted in polarization direction by 90° by the TN liquid crystal, becoming a linearly polarized light ray parallel to the page, and is thus transmitted through the fourth polarizing splitter means 8 and the first polarizing splitter means 2. The background portion is thus presented with a hue synthesized from the colors imparted by the first coloration means 71 and the second coloration means 72 and in a pattern synthesized from the patterns imparted by the first light diffusing means 91 and the second light diffusing means 92.

When the transmissive type display is presented using the light source 6 for backlighting in the display device 10, the display becomes brighter thanks to the fourth polarizing splitter means 8 arranged between the first polarizing splitter means 2 and the polarization axis varying means 3. Specifically, part of the linearly polarized light component, which is emitted from the backlighting light source 6 and then transmitted through the second polarizing splitter means 4 and the polarization axis varying means 3, is not transmitted through the first polarizing splitter means 2, because of the deflection of its polarization axis from the first direction, in the background portion corresponding to the no voltage applied (OFF) area in the polarization axis varying means 3. Such linearly polarized light component is then reflected from the fourth polarizing splitter means 8, is again transmitted through the polarization axis varying means 3 and is again reflected from the second polarizing splitter means 4. In this way, the linearly polarized light component, which has failed to be transmitted through the first polarizing splitter means 2, is reflected from the fourth polarizing splitter means 8, and is repeatedly reflected between the second polarizing splitter means 4 and the fourth polarizing splitter means 8. In the course of repeated reflections, its polarization axis becomes aligned with the first direction. Therefore, even if the linearly polarized light component has failed to be transmitted through the first polarizing splitter means 2 because of the deflection of its polarization axis from the first direction, it subsequently reaches the eye of the user. A brighter display thus results.

Industrial Applicability

As discussed in connection with the first through ninth embodiments, in the display device and the electronic watch, for achieving the first object of the present invention, a light ray transmitted through an area of polarization axis varying means which varies polarization axis, and a light ray transmitted through an area of the polarization axis varying means which does not vary the polarization axis, are output respectively as a linearly polarized light component (a first returning light ray) which is reflected from specular reflective means and transmitted through second polarizing splitter means, polarization axis varying means, and first polarizing splitter means, and a linearly polarized light component (a second returning light ray) which is reflected by the second polarizing splitter means and transmitted through the polarization axis varying means and the first polarizing splitter means. Since the electronic watch thus presents a background portion and a segment portion in a bright display, the legibility of a display is advantageously high. Since both the first returning light and the second returning light are specularly reflected light rays, a high degree of flexibility is assured in the combination of display modes, in which both the background portion and the segment portion are presented in a mirror-like image. For example, the electronic watch can provide a display mode with both the background portion and the segment portion presented in a mirror-like image, a display mode with both the background portion and the segment portion presented in a matte image, or a display mode with one of the background portion and the segment portion in a mirror-like image and the other in a matte image.

With coloration means added, display modes are thus diversified by combining a diversity of tones combined with texture differences. This arrangement provides display modes aesthetically appealing to users.

As discussed in connection with tenth through sixteenth embodiments, in the display device and the electronic watch, for achieving the second object of the present invention, out of the returning light which is reflected from the specular reflective means, transmitted through the second polarizing splitter means, the polarization axis varying means, and the first polarizing splitter means, a linearly polarized light component, which is unable to be transmitted through the first polarizing splitter means with the direction of its polarization axis deviating from a first direction, is reflected from fourth polarizing splitter means. The linearly polarized light component repeats reflections between the reflective means and the fourth polarizing splitter means, and when the polarization axis of the linearly polarized light component becomes aligned with the first direction, the linearly polarized light component is transmitted through the first polarizing splitter means. For this reason, the amount of light contributing to displaying increases, and a bright display is thus presented.

With coloration means added, display modes are thus diversified by combining a diversity of tones combined with texture differences. This arrangement provides display modes aesthetically appealing to users.

What is claimed is:

1. A display device comprising:
  a first polarization separator which transmits a linearly polarized light component, of an incident light ray, aligned in a first direction, and which does not transmit a linearly polarized light component aligned in a direction perpendicular to the first direction,
  a polarization changing element which selects one of a first state which varies a polarization axis of an incident linearly polarized light component when the incident linearly polarized light component is transmitted therethrough and a second state which does not vary the polarization axis when the incident linearly polarized light component is transmitted therethrough,
  a second polarization separator which transmits a linearly polarized light component of an incident light ray aligned in a second direction, and which specularly reflects a linearly polarized light component aligned in a third direction perpendicular to the second direction, and a specular reflecting element which specularly reflects a linearly polarized light component transmitted through the second polarization separator toward the second polarization separator, the first polarization separator, the polarization changing element, the second polarization separator, and the specular reflecting element being arranged in order, and the display device displaying predetermined information using a first returning light ray which is specularly reflected from the specular reflecting element and transmitted through the second polarization separator, the polarization changing element, and the first polarization separator, and a second light ray which is specularly reflected from the second polarization separator and transmitted through the polarization changing element and the first polarization separator, out of light rays which come in on the first polarization separator from a side of the first polarization separator diametrically opposite to the polarization changing element.

2. The display device according to claim 1, the specular reflecting element being a total reflection optical element that reflects all of or most of the linearly polarized light component incident thereon.

3. The display device according to claim 2, the total reflection optical element being a total reflection mirror that reflects all of or most of the linearly polarized light component incident thereon.

4. The display device according to claim 2, the total reflection optical element being a third polarization separator which reflects all of or most of the linearly polarized light component aligned in the second direction, and which does not reflect the linearly polarized light component align in a direction perpendicular to the second direction.

5. The display device according to claim 1, the specular reflecting element being a partially reflective optical element which specularly reflects a part of an incident linearly polarized light component, and which transmits a remaining incident linearly polarized light component.

6. The display device according to claim 5, the partially reflective optical element being a half mirror in which a metal thin film is formed on a surface of a light transmissive substrate.

7. The display device according to claim 5, the partially reflective optical element being a third polarization separator which transmits a linearly polarized light component aligned in a fourth direction and which specularly reflects a linearly polarized light component aligned in a fifth direction perpendicular to the fourth direction, and, because of a deflection between the fourth direction and the second direction, the third polarization separator specularly reflecting a part of a linearly polarized light component incident thereon and transmitting a part of the incident linearly polarized light component.

8. The display device according to claim 5, further comprising a light source for backlighting disposed diametrically opposite to the second polarization separator with respect to specular reflecting element which emits light toward the specular reflecting element, the display device displaying predetermined information using a linearly polarized light component which is emitted from the backlighting light source, and which is transmitted through the specular reflecting element, the second polarization separator, the polarization changing element, and the first polarization separator.

9. The display device according to claim 1, further comprising a fourth polarization separator arranged between the first polarization separator and the polarization changing element which transmits a linearly polarized light component aligned in a sixth direction and which reflects a linearly polarized light component aligned in a seventh direction perpendicular to the sixth direction, the sixth direction being in a same direction as the first direction or is slightly deflected from the first direction.

10. The display device according to claim 1, further comprising a first light diffusing element disposed between the specular reflecting element and the second polarization separator which transmits an incident light ray and which diffuses the incident light ray.

11. The display device according to claim 10, further comprising a second light diffusing element disposed between the second polarization separator and the polarization changing element which transmits an incident light ray and which diffuses the incident light ray in a pattern different from a pattern of the first light diffusing element.

12. The display device according to claim 10, the first light diffusing element diffusing the light ray through fine surface roughness.

13. The display device according to claim 1, further comprising a first coloring element disposed between the specular reflecting element and the second polarization separator which colors an incident light ray to output a colored light ray.

14. The display device according to claim 13, the first coloring element being a color filter.

15. The display device according to claim 13, the first coloring element being a coloring layer attached on at least one polarization separator.

16. The display device according to claim 1, further comprising a second coloring element disposed between the first polarization separator and the second polarization separator which colors an incident light ray to output a colored light ray.

17. The display device according to claim 1, further comprising a first coloring element disposed between the specular reflecting element and the second polarization separator which colors an incident light ray to output a colored light ray, and a second coloring element disposed between the first polarization separator and the second polarization separator which colors an incident light ray to output a colored light ray with a hue different from a hue imparted by the first coloring element.

18. The display device according to claim 1, the polarization changing element comprising a liquid-crystal display element.

19. An electronic watch comprising the display device according to claim 1, the electronic watch displaying time and time measurement results in areas of the polarization changing element which are selected to be in a transmissive state which transmits the linearly polarized light component transmitted through the first polarization separator therethrough with a polarization axis of the linearly polarized light component varied, or in a transmissive state which transmits the linearly polarized light component therethrough with the polarization axis not varied.

20. The electronic watch according to according to claim 19, the electronic watch displaying time and time measurement results in a digital display in areas of the polarization changing element which are selected to be in a transmissive state which transmits the linearly polarized light component transmitted through the first polarization separator therethrough with the polarization axis of the linearly polarized light component varied, or in a transmissive state which transmits the linearly polarized light component therethrough with the polarization axis not varied.

21. The electronic watch according to according to claim 19, the electronic watch displaying time and time measurement results in an analog display pattern corresponding to a watch hand, in areas of the polarization changing element which are selected to be in a transmissive state which transmits the linearly polarized light component transmitted through the first polarization separator therethrough with the polarization axis of the linearly polarized light component varied, or in a transmissive state which transmits the linearly polarized light component therethrough with the polarization axis not varied.

22. The display device according to claim 1, further comprising:
    a fourth polarization separator which is disposed between the first polarization separator and the polarization changing element, which transmits a linearly polarized light component of an incident light ray aligned in a same direction as the first direction, or aligned in a direction slightly deflected from the first direction, and which reflects a linearly polarized light component aligned in a direction perpendicular the first direction.

23. The display device according to claim 22, direction of the polarization axis of the linearly polarized light component transmitted through the third polarization separator forming angle of 20° or smaller with the first direction.

24. The display device according to claim 22, a direction of the polarization axis of the linearly polarized light component transmitted through the third polarization separator forming an angle of 5° or smaller with the first direction.

25. The display device according to claim 22, the second polarization separator reflecting a linearly polarized light component aligned in a third direction perpendicular to the second direction.

26. The display device according to claim 25, further comprising a second coloring element disposed between the first polarization separator and the second polarization separator which colors an incident light ray to output a colored light ray.

27. The display device according to of claim 25, further comprising a first coloring element disposed between the reflecting element and the second polarization separator which colors an incident light ray to output a colored light ray, and second coloring element disposed between the first polarization separator and the second polarization separator which colors an incident light ray to output a colored light ray with a hue different from a hue imparted by the first coloring element.

28. The display device according to claim 22, the reflecting element being a total reflection optical element which reflects all of or most of the linearly polarized light component incident thereon.

29. The display device according to claim 28, the total reflection optical element being a total reflection mirror which reflects all of or most of the linearly polarized light component incident thereon.

30. The display device according to claim 28, the total reflection optical element being a third polarization separator which reflects all of or most of the linearly polarized light component aligned in the second direction and which does not reflect the linearly polarized light component aligned in a direction perpendicular the second direction.

31. The display device according to claim 22, the reflecting element being a partially reflecting optical element which reflects a part of a linearly polarized light component incident thereon and which transmits a remaining incident linearly polarized light component.

32. The display device according to claims 31, the partially reflective optical element being a half mirror in which a metal thin film is formed on a surface of a light transmissive substrate.

33. The display device according to claim 31, the partially reflecting optical element being a third polarization separator which transmits a linearly polarized light component aligned in a fourth direction and which reflects a linearly polarized light component aligned in a fifth direction perpendicular to the fourth direction, and, because of a deflection between the fourth direction and the second direction, the fourth polarization separator reflecting a part of a linearly polarized light component incident thereon, and transmitting a part of the incident linearly polarized light component.

34. The display device according to claim 31, further comprising a light source for backlighting disposed diametrically opposite to the second polarization separator with respect to the reflecting element which emits light toward the reflecting element,
    the display device displaying predetermined information using a linearly polarized light component which is emitted from the backlighting light source and transmitted through the reflecting element, the second polarization separator, the polarization changing element, and the first polarization separator.

35. The display device according to claim 22, further comprising a first light diffusing element disposed between the reflecting element and the second polarization separator which transmits an incident light ray and which diffuses the incident light ray.

36. The display device according to claim 35, further comprising a second light diffusing element disposed between the second polarization separator and the polarization changing element which transmits an incident light ray and which diffuses the incident light ray in a pattern different from a pattern imparted by the first light diffusing element.

37. The display device according to claim 35, the second light diffusing element diffusing the light ray through fine surface roughness.

38. The display device according to claim 22, further comprising a first coloring element disposed between the reflecting element and the second polarization separator which colors an incident light ray to output a colored light ray.

39. The display device according to claim 38, the first coloring element being a color filter.

40. The display device according to claim 38, the first coloring element being a coloring layer attached on at least one polarization separator.

41. The display device according to claim 22, the polarization changing element comprising a liquid-crystal display element.

42. An electronic watch comprising a display device according to claim 22, the electronic watch displaying time and time measurement results in areas of the polarization changing element which are selected to be in a transmissive state which transmits the linearly polarized light component transmitted through the first polarization separator therethrough with a polarization axis of the linearly polarized light component varied, or in a transmissive state which transmits the linearly polarized light component therethrough with the polarization axis not varied.

43. The electronic watch according to according to claim 42, the electronic watch displaying time and time measurement results in a digital display in areas of the polarization changing element which are selected to be in a transmissive state which transmits the linearly polarized light component transmitted through the first polarization separator therethrough with a polarization axis of the linearly polarized light component varied, or in a transmissive state which transmits the linearly polarized light component therethrough with the polarization axis not varied.

44. The electronic watch according to according to claim 42, the electronic watch displaying time and time measurement results in an analog display pattern corresponding to a watch hand in areas of the polarization changing element which are selected to be in a transmissive state which transmits the linearly polarized light component transmitted through the first polarization separator therethrough with a polarization axis of the linearly polarized light component varied, or in a transmissive state which transmits the linearly polarized light component therethrough with the polarization axis not varied.

45. The display device according to claim 1, further comprising a fourth polarization separator arranged between the first polarization separator and the polarization changing element which reflects a linearly polarized light component aligned in a sixth direction and which reflects a linearly polarized light component aligned in a seventh direction perpendicular to the sixth direction, the sixth direction being in a same direction as the first direction or is slightly deflected from the first direction.

* * * * *